United States Patent
Kikukawa et al.

(10) Patent No.: US 7,052,397 B2
(45) Date of Patent: May 30, 2006

(54) ENTERTAINMENT SYSTEM, RECORDING MEDIUM AND ENTERTAINMENT APPARATUS

(75) Inventors: Hideaki Kikukawa, Tokyo (JP); Hajime Saito, Tokyo (JP); Fumiaki Hara, Tokyo (JP); Kenji Kaido, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 119 days.

(21) Appl. No.: 10/465,264

(22) Filed: Jun. 18, 2003

(65) Prior Publication Data

US 2003/0211891 A1 Nov. 13, 2003

Related U.S. Application Data

(63) Continuation of application No. 09/456,686, filed on Dec. 9, 1999, now Pat. No. 6,599,196.

(30) Foreign Application Priority Data

Dec. 11, 1998 (JP) .......................... 10-353037

(51) Int. Cl.
*A63F 9/24* (2006.01)

(52) U.S. Cl. .......................... 463/43; 463/30
(58) Field of Classification Search .............. 463/1, 463/30–31, 36, 37–44, 47; 273/148 B, 148 R; 345/156, 157, 161, 169
See application file for complete search history.

(56) References Cited

U.S. PATENT DOCUMENTS

| | | | |
|---|---|---|---|
| 5,390,937 A | * | 2/1995 | Sakaguchi et al. .......... 463/7 |
| 5,797,085 A | | 8/1998 | Beuk et al. |
| 5,897,437 A | * | 4/1999 | Nishiumi et al. .......... 463/47 |
| 5,989,099 A | | 11/1999 | Arnold, III et al. |
| 6,030,291 A | | 2/2000 | Maki et al. |
| 6,171,191 B1 | | 1/2001 | Ogata et al. |
| 6,225,975 B1 | | 5/2001 | Furuki et al. |
| 6,280,327 B1 | * | 8/2001 | Leifer et al. .......... 463/39 |
| 6,599,196 B1 | * | 7/2003 | Kikukawa et al. .......... 463/43 |

FOREIGN PATENT DOCUMENTS

| | | |
|---|---|---|
| EP | 0 834 338 | 4/1998 |
| EP | 0 867 212 | 9/1998 |
| JP | 09-000741 | 1/1997 |
| JP | 09 000741 | 1/1997 |
| JP | 9 313 736 | 12/1997 |
| JP | 10-258181 | 9/1998 |
| JP | 10-2777264 | 10/1998 |
| JP | 10 295937 | 11/1998 |
| JP | 2000 157719 | 6/2000 |

OTHER PUBLICATIONS

"Mario Kart" Play Guide (New Edition) pp. 10–11, Published on May 30, 1998 by Futabasha.
"Bushido Blade" Play Guide (First Edition) p. 37 published on Jun. 6, 1997 by DigiCube Co., Ltd.

* cited by examiner

*Primary Examiner*—Kim Nguyen
(74) *Attorney, Agent, or Firm*—Frommer Lawrence & Haug LLP; William S. Frommer; Samuel S. Lee

(57) ABSTRACT

An effect application instructing function includes a user setting function for setting up information as to users of an entertainment apparatus to generate a user information table, an event processing function for reading input information from one or more manual controllers and processing data depending on the input information to generate an event processing table, a vibration setting function for extracting only information relative to vibrations from the event processing table and successively registering vibrations types with respect to the user to which vibrations are to be applied in a vibration output table, and a vibration outputting function for generating and outputting vibration indicating data including a vibration type with respect to the user to which vibrations are to be applied, based on the vibration output table and the user information table, and executing a physical effect to be applied to a hypothetical user as a parameter change.

21 Claims, 22 Drawing Sheets

FIG. 14

USER INFORMATION TABLE

| | |
|---|---|
| RECORD 1 | PORT NUMBER (OR CODE) |
| RECORD 2 | PORT NUMBER (OR CODE) |
| RECORD 3 | PORT NUMBER (OR CODE) |
| ⋮ | ⋮ |

FIG. 15

EVENT PROCESSING TABLE

| | TYPE | USER NUMBER | CONTROL ATTRIBUTE (CALCULATED RESULT) |
|---|---|---|---|
| RECORD 1 | | | |
| RECORD 2 | | | |
| RECORD 3 | | | |
| ⋮ | | | |

FIG. 16

VIBRATION OUTPUT TABLE

| VIBRATION TYPE | | | | |
|---|---|---|---|---|
| RECORD 1 | | | · · · · | 'FF' |
| RECORD 2 | | | | |
| RECORD 3 | | | | |

FIG. 17

| TYPE | CONTROL ATTRIBUTE | DETAILS |
|---|---|---|
| 1 | ○ | ENERGIZED AT PREDETERMINED ROTATIONAL SPEED |
| 2 | × | ROTATIONAL SPEED VARIED IN CONSTANT CYCLIC PERIODS |
| 3 | □ | ROTATIONAL SPEED VARIED AT RANDOM |
| 4 | △ | INTERMITTENT ROTATIONAL SPEED |
| 5 | ○+× | ENERGIZED AT PREDETERMINED ROTATIONAL SPEED IN CONSTANT CYCLIC PERIOD |
| ...... | | ...... |
| k | △+□ | |

ENTERTAINMENT SYSTEM, RECORDING MEDIUM AND ENTERTAINMENT APPARATUS

This application is a Continuation of application Ser. No. 09/456,686, filed Dec. 9, 1999, now U.S. Pat. No. 6,599,196, the disclosure of which is incorporated herein by reference.

BACKGROUND OF THE INVENTION

1. Field of the Invention

The present invention relates to an entertainment apparatus for executing various programs, an entertainment system having the entertainment apparatus, a manual controller connected to the entertainment apparatus for entering manual control requests from the user into the entertainment apparatus, and an effect applying means disposed in the manual controller for applying physical effects to the user in response to external requests, and a recording medium storing programs and data to be downloaded to the entertainment apparatus.

2. Description of the Related Art

Some information apparatus (entertainment systems) including entertainment apparatus such as video game machines display game images stored in a recording medium such as a CD-ROM or the like on the screen of a television receiver as the game proceeds in response to a manual control action entered via a manual controller.

The entertainment apparatus and the manual controller are usually interconnected by serial interfaces. When a clock signal is sent from the entertainment apparatus to the manual controller, the manual controller sends key switch information or the like depending on a manual control action of the user in synchronism with the clock signal.

Recently, there has been developed and put to use a system including an effect applying means disposed in a manual controller for applying physical effects such as vibrations, for example, to the user in response to requests from an external source, such as an entertainment apparatus. While a game is in progress in the entertainment apparatus, the effect applying means imposes various types of vibrations on the user in response to manual control actions entered by the user.

SUMMARY OF THE INVENTION

It is therefore an object of the present invention to provide an entertainment system which is capable of applying physical effects to the user in response to manual control actions entered by the user while a game is in progress and also applying physical effects to the user based on requests from another user, thereby making it possible for the game to develop into unexpected aspects, so that if the game is a competition game, the user can enjoy realistic competitive experiences.

Another object of the present invention is to provide a recording medium which stores a program capable of applying physical effects to the user in response to manual control actions entered by the user while a game is in progress and also applying physical effects to the user based on requests from another user.

A further object of the present invention is to provide an entertainment apparatus which makes it possible for the game to develop into unexpected aspects, so that if the game is a competition game, the user can enjoy realistic competitive experiences.

According to the present invention, an entertainment system comprises an entertainment apparatus for executing various programs, a manual controller connected to the entertainment apparatus for entering manual control requests from the user into the entertainment apparatus, and effect applying means disposed in the manual controller for applying physical effects to the user in response to external requests, the entertainment apparatus having effect application instructing means for outputting an instruction to apply a physical effect to the manual controller operated by a selected one of a plurality of users based on a request from another user.

Therefore, when a selected user makes a certain control action with the manual controller while viewing the screen of the television receiver, a physical effect can be applied to the selected user based on a request from another user.

At this time, the selected user may enter an erroneous control action or have to interrupt a control action or encounter an unexpected situation because of the sudden application of the physical effect.

Consequently, in addition to a physical effect as a response to a control action made by the user while a competition game is in progress, a physical effect can be imparted to the user based on a request from another user. Such a physical effect makes it possible for the game to develop into unexpected situations, which tend to render the competition game highly realistic.

The effect applying means may comprise a vibration generator for applying vibrations to the user.

Therefore, while a competition game is being played by a plurality of users, the manual controller operated by one of the users may be vibrated by the intention of another user, thus physically interfering with control actions of the user thereby to making it difficult for the user to enter control actions or induce erroneous control actions.

As a result, the users can play more realistic competition games than heretofore. Since each of the users does not know when its control actions may be interfered with by others, the users may feel thrilled with the game being played, and the game may have unexpected developments.

The effect application instructing means may comprise means for selecting a hypothetical user (i.e., a computer), and means for affecting a physical parameter of said hypothetical user if said means for selecting a hypothetical user selects said hypothetical user. Since a hypothetical user is a hypothetical entity (character), it does not actually use a manual controller. Therefore, the value of a parameter relative to an operation speed on the display screen or a status decision capability of the hypothetical user is affected. Consequently, a game where a computer serves as an opponent, which tends to be uninteresting and dull, may be develop into realistic aspects.

The effect application instructing means may have setting means for detecting the number of manual controllers connected to the entertainment apparatus and identification data of the manual controllers, and setting up data depending on the detected number of manual controllers.

Therefore, it is possible to accurately recognize a user (actual user or hypothetical user) who has issued a request to impart a physical effect to a selected user. A physical effect can thus be applied reliably to a selected user.

The effect application instructing means may comprise means for establishing a type of the physical effect to be applied to at least the selected user depending on details of the request if the request from the user is an instruction to apply the physical effect to the selected user.

Thus, various types of a physical effect can be applied to the selected user. For example, if vibrations are applied as the physical effect, highly frequent vibrations, moderate vibrations, or less frequent vibrations may be imparted as desired to the selected user, thereby allowing the game to have realistic developments.

According to the present invention, a recording medium storing a program for use by an entertainment system having an entertainment apparatus for executing various programs, a manual controller connected to the entertainment apparatus for entering manual control requests from the user into the entertainment apparatus, and effect applying means disposed in the manual controller for applying physical effects to the user in response to external requests, the program having the step of outputting an instruction to apply a physical effect to the manual controller operated by a selected one of a plurality of users based on a request from another user. The effect applying means may comprise a vibration generator for applying vibrations to the actual user.

With the recording medium storing the above program, in addition to a physical effect as a response to a control action made by the user while a competition game is in progress, a physical effect can be imparted to the user based on a request from another user. Such a physical effect makes it possible for the game to develop into unexpected situations, which tend to render the competition game highly realistic.

The above step may comprise the step of selecting a hypothetical user, and the step of affecting a physical parameter of said hypothetical user if the step of selecting a hypothetical user selects said hypothetical user.

The above step may comprise the steps of detecting the number of manual controllers connected to the entertainment apparatus and identification data of the manual controllers, and setting up data depending on the detected number of manual controllers.

The above step may comprise the step of establishing a type of the physical effect to be applied to at least the selected user depending on details of the request if the request from the user is an instruction to apply the physical effect to the selected user.

According to the present invention, an entertainment apparatus allowing a manual controller to be connected, the manual controller having an effect applying means disposed in the manual controller for applying physical effects to the user in response to external requests, comprising an effect application instructing means for outputting an instruction to apply a physical effect to the manual controller operated by a selected one of a plurality of users based on a request from another user.

Therefore, when a selected user makes a certain control action with the manual controller while viewing the screen of the television receiver, a physical effect can be applied to the selected user based on a request from another user.

Such a physical effect makes it possible for the game to develop into unexpected situations, which tend to render the competition game highly realistic.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 14 is a diagram showing details of a user information table;

FIG. 15 is a diagram showing details of an event processing table;

FIG. 16 is a diagram showing details of a vibration output table;

FIG. 17 is a diagram showing details of a drive signal table;

DESCRIPTION OF THE PREFERRED EMBODIMENT

An entertainment system according to the present invention will be described below with reference to FIGS. 1 through 24.

Figure 1:
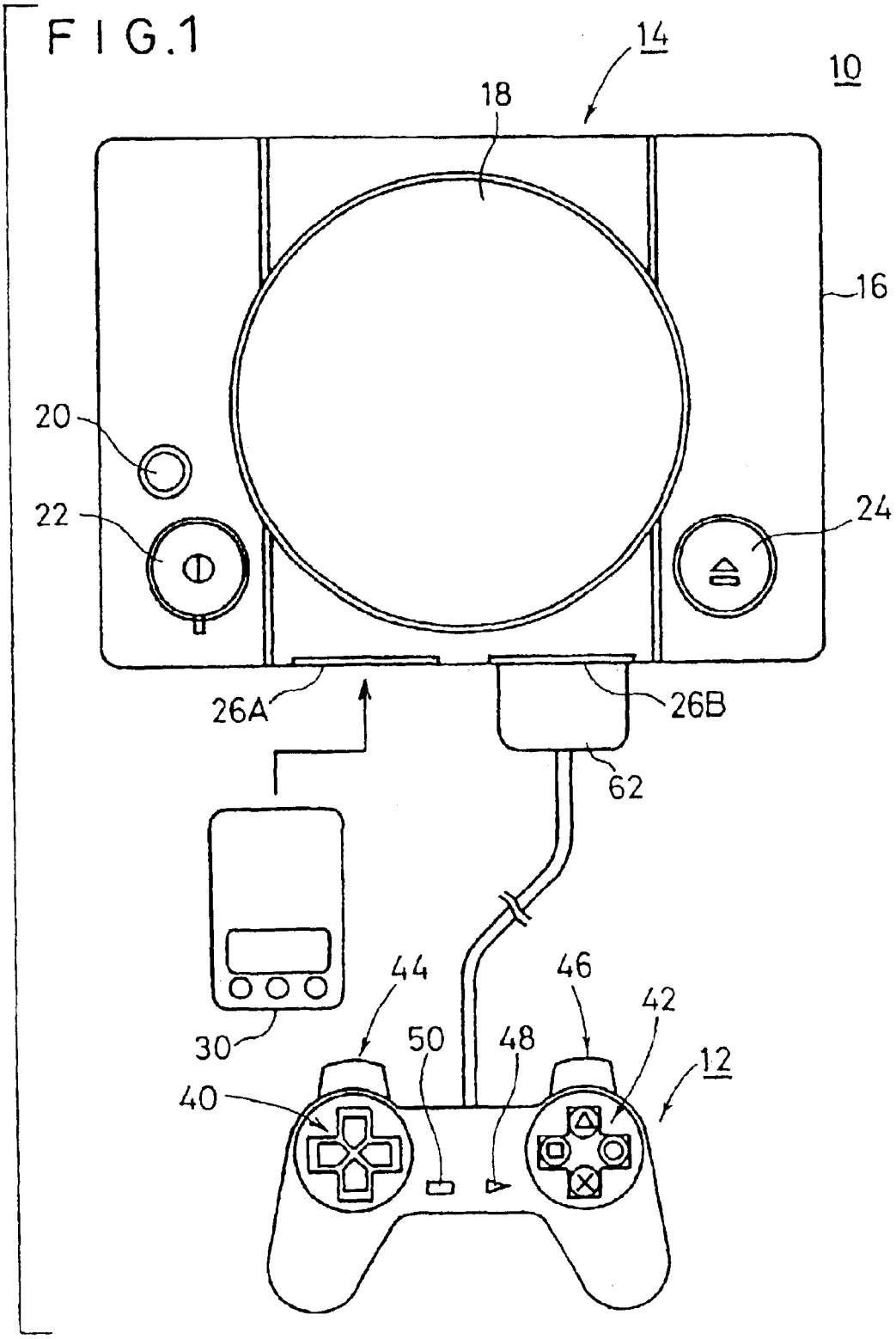
FIG. 1 is a plan view of an entertainment system according to the present invention.

As shown in FIG. 1, the entertainment system, generally denoted by 10, according to the present invention has an entertainment apparatus 14 to which a manual controller 12 is detachably connected.

The entertainment apparatus 14 reads a program and data recorded in an optical disk or the like, for example, and executes a game, for example, based on the program depending on commands from the user, e.g., the game player. The execution of the game mainly represents controlling the progress of the game and the display of images and the generation of sounds.

The entertainment apparatus 14 has a rectangular casing 16 which houses a disk loading unit 18 substantially centrally therein for loading an optical disk such as a CD-ROM or the like as a recording medium for supplying an application program recorded therein. The casing 16 supports a reset switch 20 for resetting a program which is being presently executed, a power supply switch 22, a disk control switch 24 for controlling the loading of the optical disk, and two slots 26A, 26B.

The entertainment apparatus 14 may be supplied with the application program via a communication link, rather than being supplied from the optical disk as the recording medium.

The entertainment system 10 also includes a manual controller 12 for supplying user's commands to the entertainment apparatus 14.

Two manual controllers 12 may be connected respectively to the slots 26A, 26B allow two users or game players to play a competition game, for example. A memory card 30 and a portable information terminal 32 (see FIG. 4) which have conventionally been used may also be inserted into the slots 26A, 26B. While the two slots 26A, 26B are shown in FIG. 1, the entertainment apparatus 14 may have more or less than two slots.

The manual controller 12 has first and second control pads 40, 42, third and fourth control pads 44, 46, a starter button 48, and a selector button 50. The manual controller 12 also has a vibration imparting mechanism disposed therein for imparting vibrations to the manual controller 12. Details of the manual controller 12 will be described below later on.

Figure 2:
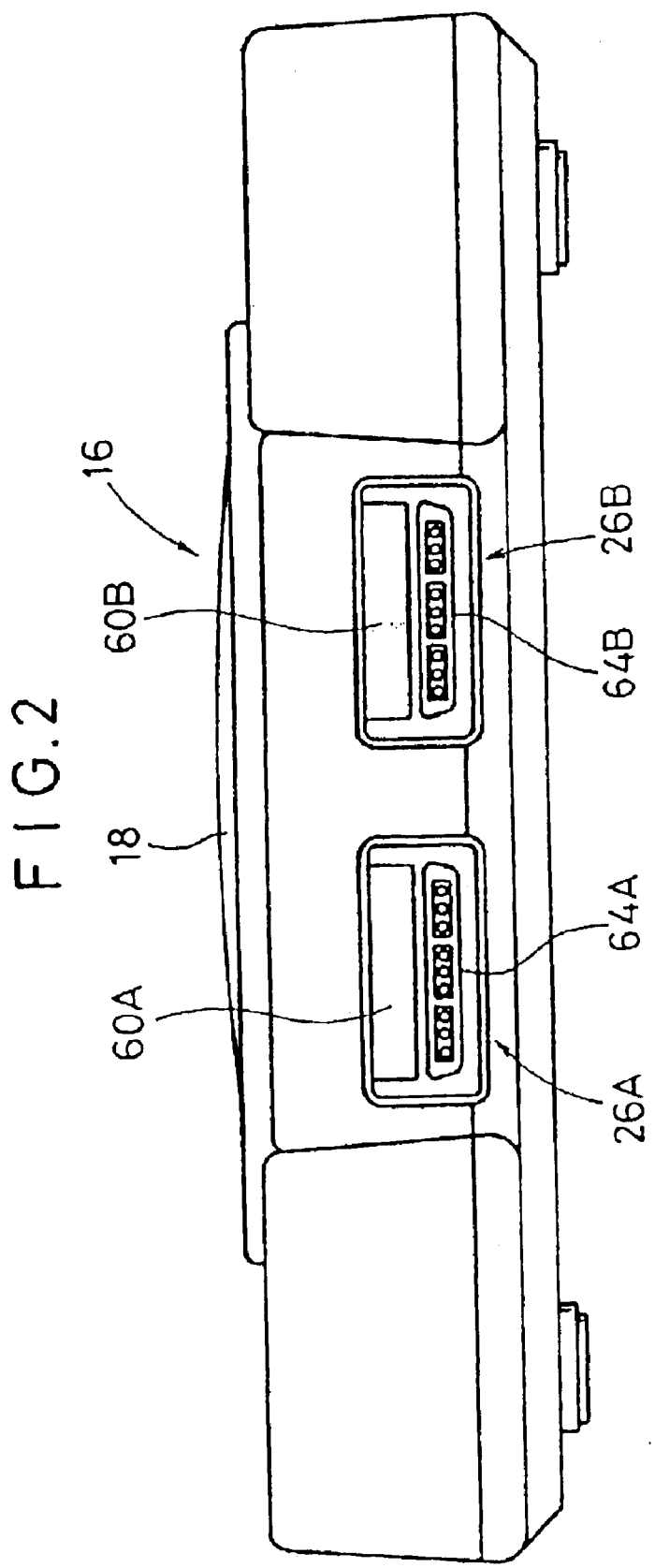
FIG. 2 is a front view of an entertainment apparatus, showing slots thereof.

FIG. 2 shows the slots 26A, 26B which are defined in a front panel of the casing 16 of the entertainment apparatus 14.

Each of the slots 26A, 26B has upper and lower units. Specifically, the slots 26A, 26B have respective memory card insertion units 60A, 60B as their upper units for inserting the memory card 30 or the portable information terminal 32 therein and respective controller connectors (jacks) 64A, 64B as their lower units for connection to a connection terminal 62 (connector, see FIG. 1) of the manual controller 12.

The memory card insertion units 60A, 60B have respective insertion holes (slots) that are of a horizontally elongate rectangular shape. These insertion slots have lower opposite corners round in contrast to upper opposite corners thereof so that the memory card 30 and the portable information terminal 32 will not be inserted into the memory card insertion units 60A, 60B in the wrong orientation. The memory card insertion units 60A, 60B also have shutters for protecting connection terminals disposed therein for electric connection.

The controller connectors 64A, 64B also have respective insertion holes (slots) that are of a horizontally elongate rectangular shape. These insertion slots have lower opposite corners round in contrast to upper opposite corners thereof so that the connector terminal 62 of the manual controller 12 will not be connected to the controller connectors 64A, 64B in the wrong orientation. The insertion holes of the controller connectors 64A, 64B are different in shape from the insertion holes of the memory card insertion units 60A, 60B so that the memory card 30 and the portable information terminal 32 will not be inserted into the insertion holes of the controller connectors 64A, 64B.

Figure 3:
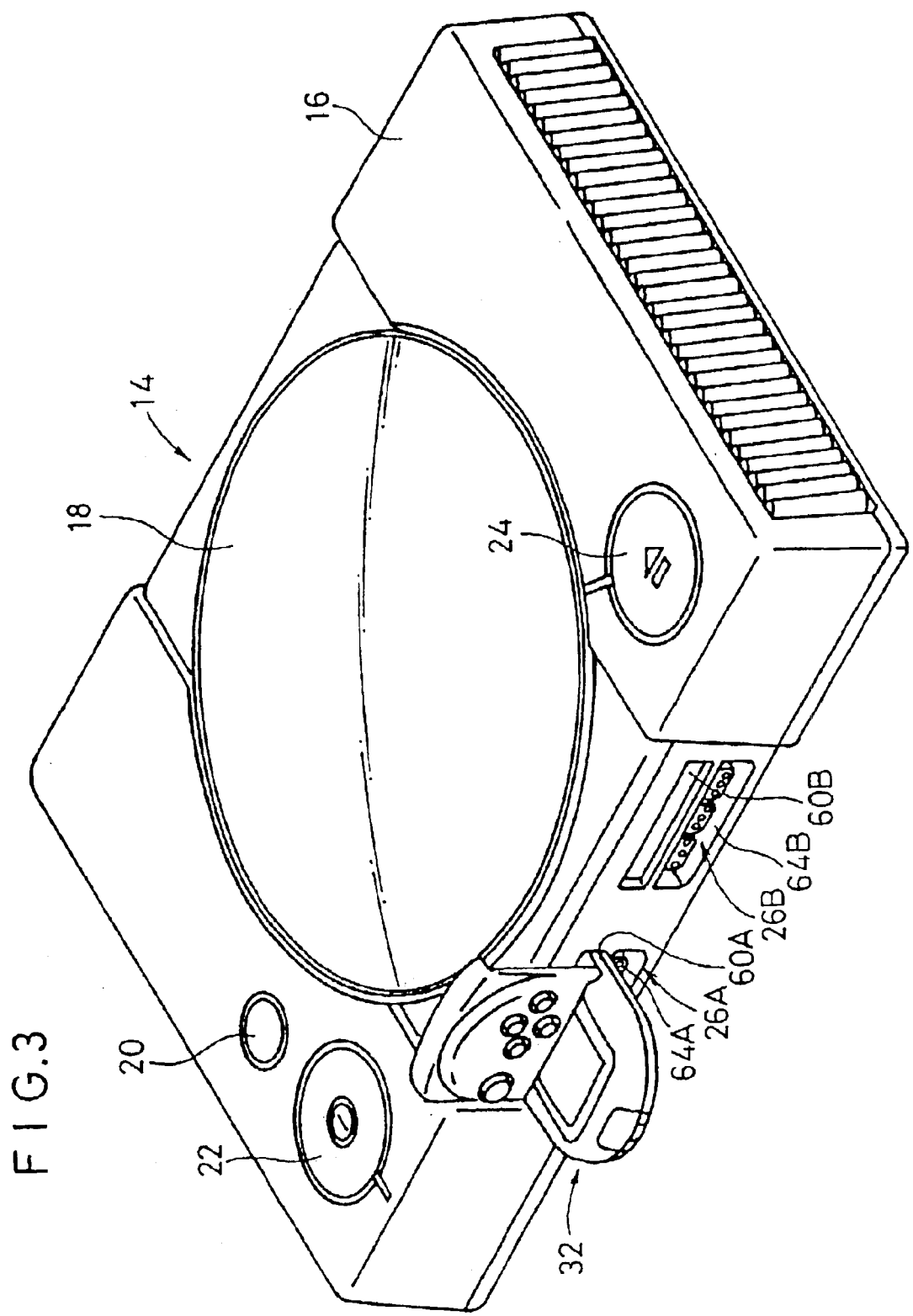
FIG. 3 is a perspective view of an entertainment apparatus.

In FIG. 3, the portable information terminal 32 is inserted in the memory card insertion unit 60A in the slot 26A which is defined in the front panel of the entertainment apparatus 14.

Figure 4:
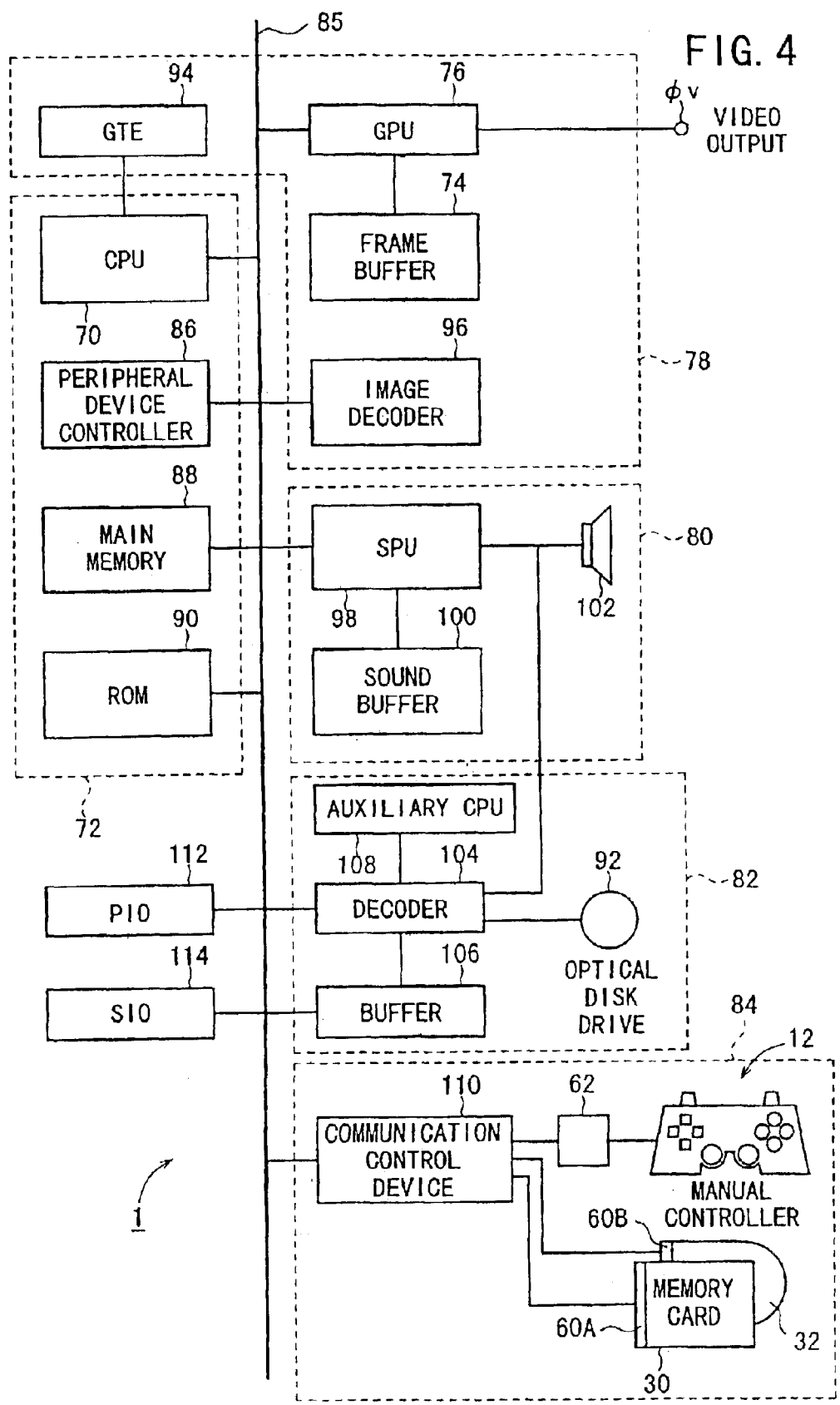
FIG. 4 is a block diagram of a specific arrangement of major components of the entertainment apparatus.

A specific arrangement of the entertainment apparatus 14 will be described below with reference to FIG. 4. As shown in FIG. 4, the entertainment apparatus 14 comprises a control system 72 including a central processing unit (CPU) 70 and its peripheral devices, a graphic system 78 including a graphic processing unit (GPU) 76 for generating and storing image data in a frame buffer 74, a sound system 80 including a sound processing unit (SPU) 98 for generating music sounds and sound effects, an optical disk controller 82 for controlling an optical disk in which application programs are recorded, a communication controller 84 for controlling signals from the manual controller 12 which enter instructions from the user, and data supplied to and from a memory card 30 and a portable information terminal 32 which stores game settings, and a bus 85 to which the control system 72, the graphic system 78, the sound system 80, the optical disk controller 82, and the communication controller 84 are connected.

The control system 72 comprises a CPU 70, a peripheral device controller 86 for controlling interrupts and direct memory access (DMA) data transfer, a main memory 88 comprising a random-access memory (RAM), and a read-only memory (ROM) 90 which stores various programs such as an operating system for managing the main memory 88, the graphic system 78, the sound system 80, etc. The main memory 88 is a memory capable of storing a program which is being executed.

The CPU 70 controls the entertainment apparatus 14 in its entirety by executing the operating system stored in the ROM 90. The CPU 70 comprises a 32-bit RISC-CPU, for example.

When the entertainment apparatus 14 is turned on, the CPU 70 executes the operating system stored in the ROM 90 to start controlling the graphic system 78, the sound system 80, etc. For example, when the operating system is executed, the CPU 70 initializes the entertainment apparatus 14 in its entirety for confirming its operation, and thereafter controls the optical disc controller 82 to execute an application program recorded in the optical disk.

As the application program is executed, the CPU 70 controls the graphic system 78, the sound system 80, etc. depending on commands entered from the user for thereby controlling the display of images and the generation of music sounds and sound effects.

The graphic system 78 comprises a geometry transfer engine (GTE) 94 for performing coordinate transformations and other processing, a GPU 76 for generating image data according to instructions from the CPU 70, a frame buffer 74 for storing image data generated by the GPU 76, and an image decoder 96 for decoding image data compressed and encoded by an orthogonal transform such as a discrete cosine transform.

The GTE 94 has a parallel arithmetic mechanism for performing a plurality of arithmetic operations parallel to each other, and can perform coordinate transformations, light source calculations, matrixes, or vectors at a high speed in response to a request from the CPU 70. Specifically, the GTE 94 can calculate the coordinates of a maximum of 1.5 million polygons per second for a flat shading process to plot one triangular polygon with one color, for example. With the GTE 94, the entertainment apparatus 14 is able to reduce the burden on the CPU 70 and perform high speed coordinate calculations.

According to an image generating instruction from the CPU 70, the GPU 76 generates and stores the data of a polygon or the like in the frame buffer 74. The GPU 76 is capable of generating and storing a maximum of 360 thousand polygons per second.

The frame buffer 74 comprises a dual-port RAM, and is capable of simultaneously storing image data generated by the GPU 76 or image data transferred from the main memory 88, and reading image data for display.

The frame buffer 74 has a storage capacity of 1 Mbytes, for example, and is handled as a 16-bit matrix made up of a horizontal row of 1024 pixels and a vertical column of 512 pixels. The frame buffer 74 has a display area for storing image data to be outputted as video output data, a CLUT (color look-up table) area for storing a color look-up table which will be referred to by the GPU 76 when it generates a polygon or the like, and a texture area for storing texture data to be subjected to coordinate transformations when a polygon is generated and mapped onto a polygon generated by the GPU 76. The CLUT area and the texture area are dynamically varied as the display area is varied.

The GPU 76 can perform, in addition to the flat shading process, a Gouraud shading process for determining colors in polygons by interpolating intensities from the vertices of the polygons, and a texture mapping process for mapping textures stored in the texture areas onto polygons. For performing the Gouraud shading process or texture mapping process, the GTE 94 can perform coordinate calculations for a maximum of about 500,000 polygons per second.

The image decoder 96 is controlled by the CPU 70 to decode image data of a still or moving image stored in the main memory 88, and store the decoded image into the main memory 88.

Image data reproduced by the image decoder 96 is transferred to the frame buffer 74 by the GPU 76, and can be used as a background for an image plotted by the GPU 76.

The sound system 80 comprises an SPU 98 for generating music sounds, sound effects, etc. based on instructions from the CPU 70, a sound buffer 100 for storing waveform data from the SPU 98, and a speaker 102 for outputting music sounds, sound effects, etc. generated by the SPU 98.

The SPU 98 has an ADPCM (adaptive differential PCM) function for reproducing 16-bit sound data which has been encoded as 4-bit differential sound data by ADPCM, a reproducing function for reproducing the waveform data stored in the sound buffer 100 to generate sound effects, etc., and a modulating function for modulating and reproducing the waveform data stored in the sound buffer 100.

The sound system 80 can be used as a sampling sound source which generates music sounds, sound effects, etc. based on the waveform data stored in the sound buffer 100 according to commands from the CPU 70.

The optical disk controller 82 comprises an optical disk drive 92 for reproducing application programs and data recorded on an optical disk, a decoder 104 for decoding programs and data that are recorded with an error correcting code added thereto, and a buffer 106 for temporarily storing data read from the optical disk drive 92 so as to allow the data from the optical disk to be read at a high speed. An auxiliary CPU 108 is connected to the decoder 104.

Sound data recorded on the optical disk which is read by the optical disk drive 92 includes PCM data converted from analog sound signals, in addition to the ADPCM data.

The ADPCM data, which is recorded as 4-bit differential data of 16-bit digital data, is decoded by the decoder 104, supplied to the SPU 98, converted thereby into analog data, and applied to drive the speaker 102.

The PCM data, which is recorded as 16-bit digital data, is decoded by the decoder 104 and then applied to drive the speaker 102.

The communication controller 84 comprises a communication control device 110 for controlling communication with the CPU 70 via the bus 95. The communication control device 110 has the connection terminal 62 to which the manual controller 12 for entering commands from the user is connected, and the memory card insertion units 60A, 60B for receiving a memory card 30 as an auxiliary memory device for storing game settings, etc. and the portable information terminal 32.

The manual controller 12 connected to the connection terminal 62 has 16 command keys, for example, for entering commands from the user, and transmits statuses of the command keys about 60 times per second to the communication control device 110 by way of synchronous communication according to an instruction from the communication control device 110. The communication control device 110 transmits the statuses of the command keys to the CPU 70.

In this manner, commands from the user are applied to the CPU 70, which carries out a process according to the commands based on the game program being executed.

A large amount of image data needs to be transferred at high speed between the main memory 88, the GPU 76, the image decoder 96, and the decoder 104 for reading a program, displaying an image, or generating and storing image data.

In the entertainment apparatus 14, data are transferred directly between the main memory 88, the GPU 76, the image decoder 96, and the decoder 104 according to the DMA data transfer under the control of the peripheral device controller 86, rather than the CPU 70. Therefore, the burden on the CPU 70 can be reduced for data transfer, and high-speed data transfer can be achieved between the main memory 88, the GPU 76, the image decoder 96, and the decoder 104.

When setting data of a game being executed need to be stored, the CPU 70 transmits the setting data to the communication control device 110, which writes the transmitted setting data into the memory card 30 or the portable information terminal 32 which is inserted in the memory card insertion unit 60A or 60B.

The communication control device 110 has a built-in protection circuit for protection against electric breakdown. The memory card 30 and the portable information terminal 32 are separate from the bus 85, and can be connected and disconnected while the entertainment apparatus 16 is being energized. Therefore, when the memory card 30 and the portable information terminal 32 suffer a storage capacity shortage, a new memory card 30 or portable information terminal 32 can be connected without having to turning off the entertainment apparatus 16. Consequently, any game data that need to be backed up can be stored in a new memory card 30 or portable information terminal 32 connected to the entertainment apparatus 14, without the danger of being lost.

As shown in FIG. 4, the entertainment apparatus 14 further includes a parallel I/O interface (PIO) 112 for system extension and a serial I/O interface (SIO) 114 for connection to an external terminal, described later on.

Figure 5:
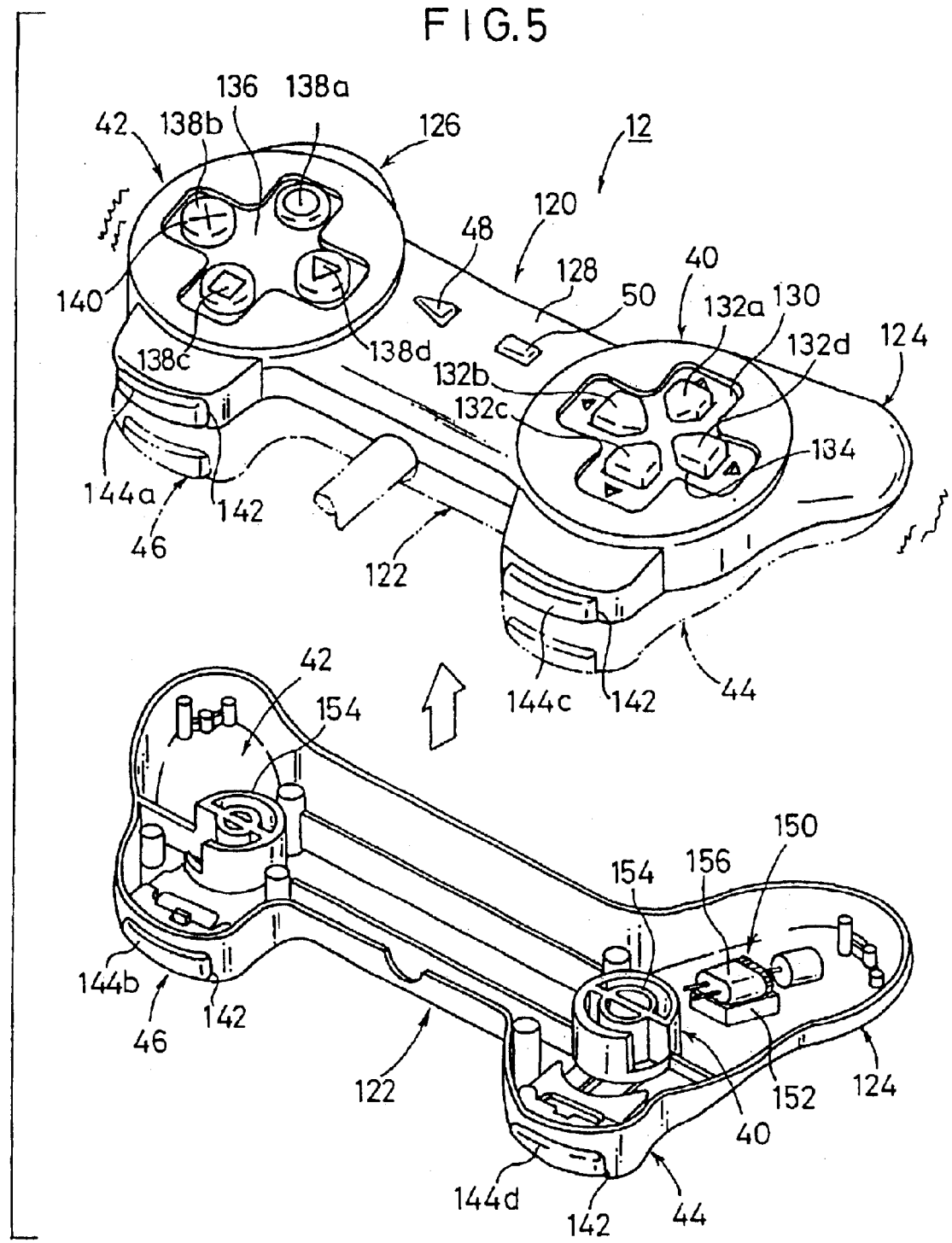
FIG. 5 is an exploded perspective view of a manual controller, with a lower case detached.

The manual controller 12 will be described in detail below with reference to FIGS. 5 through 11. As shown in FIG. 5, the manual controller 12 is shaped like spectacles, and has a housing comprising an upper case 120 and a lower case 122 that can be vertically separated from each other. The manual controller 12 has first and second control supports 124, 126 projecting like horns from longitudinal opposite ends of the housing for the user to grip with both hands.

The manual controller 12 also has a starter/selector assembly 128 disposed on a central reduced-width portion of the housing and comprising switches for starting a game and making selections. The first and second control pads 40, 42 are mounted respectively on the longitudinal opposite ends of the housing at symmetrical positions, and each have a circular shape supporting a plurality of switches disposed substantially centrally therein. The third and fourth control pads 44, 46 are mounted respectively on front sides of the housing near the longitudinal opposite ends thereof at symmetrical positions, and each having a plurality of switches that can be operated mainly by finger and middle fingers.

The starter/selector assembly has the starter button 48 and the selector button 50 which are positioned intermediate between the first and second control pads 40, 42. The selector button 50 serves to select levels of difficulty when the game is started, and the starter button 48 serves to actually start the game.

The first control pad 40 has a substantially crisscross-shaped cavity 130 defined in one of the longitudinal ends of the housing centrally in the circular shape thereof, and four windows 134 disposed in the cavity 130 with four key tops 132a, 132b, 132c, 132d projecting outwardly respectively through the windows 134. The windows 134 are positioned such that the key tops 132a, 132b, 132c, 132d projecting therethrough are oriented in a crisscross pattern within the substantially crisscross-shaped cavity 130 and have respective heads confronting each other.

Similarly, the second control pad 42 has a substantially crisscross-shaped cavity 136 defined in the other of the longitudinal ends of the housing centrally in the circular shape thereof, and four cylindrical tubes 140 disposed in the cavity 136 and having respective openings with four key tops 138a, 138b, 138c, 138d projecting outwardly respectively through the cylindrical tubes 140. The cylindrical tubes 140 are positioned in a crisscross pattern within the substantially crisscross-shaped cavity 136.

Marks such as ○, △, □, X, for example, indicative of switch functions that can easily be visually recognized to identify the switch functions are applied respectively to the upper ends of the four key tops 138a, 138b, 138c, 138d. The lower ends of the key tops 138a, 138b, 138c, 138d and the lower portions of the tubes 140 have their unique projections and recesses such that the key tops will be inserted into only their companion tubes, but not other tubes.

The third and fourth control pads 44, 46 project respectively from front walls of the first and second control pads 40, 42, and have openings 142 in the form of two pairs of two vertically spaced parallel slender slots defined in a front wall of the projecting control pad, and movement indicating switches comprising slender key tops 144a, 144b, 144c, 144d fitted respectively in the openings 142 and projecting outwardly.

For using the manual controller 12, the connection terminal 62 (see FIG. 1) of the manual controller 12 is connected to the entertainment apparatus 14, which is connected to a display monitor such as a television receiver. Usually, the user holds the manual controller 13 with both hands, and operates the first, second, third, and fourth control pads 40, 42, 44, 46 with fingers of both hands to indicate movements for a motion target such as a game character displayed on the display screen of the display monitor to proceed with the game.

The manual controller 12 also has a response means 150 disposed in a space within the housing.

Specifically, the housing composed of the upper case 120 and the lower case 122 includes a response means mount 152 in the first control support 124 projecting from the lower case 122 and supporting the response means 150.

The first and second control pads 40, 42 in the lower case 122 has a pair of cylindrical mounts 154 for each supporting a board and switches. The third and fourth control pads 44, 46, which are of an elongate rectangular shape, project from respective front faces of the first and second control pads 40, 42.

Figure 8:
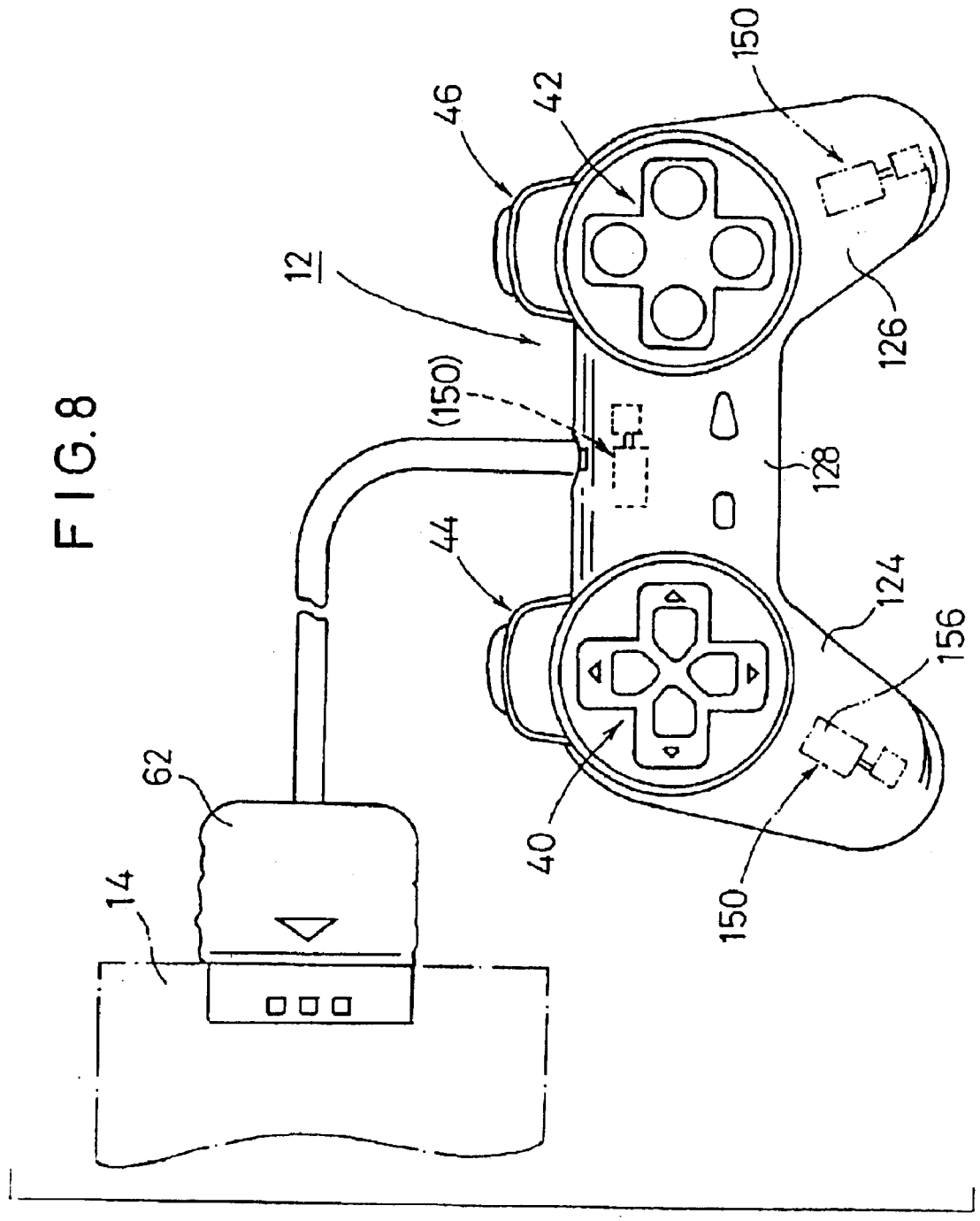
FIG. 8 is a plan view of the manual controller, showing the position where the response means is incorporated.

In the lower case 122, the space accommodating the response means 150 may be placed in one of the first and second control supports 124, 126 that can be gripped by both hands of the user or in the central reduced-width portion of the housing in front of the starter/selector assembly 128, as shown in FIGS. 5 and 8. In the illustrated embodiment, the response means 150 is positioned in the first control support 124 which can be gripped by the left hand of the user.

Figure 6:
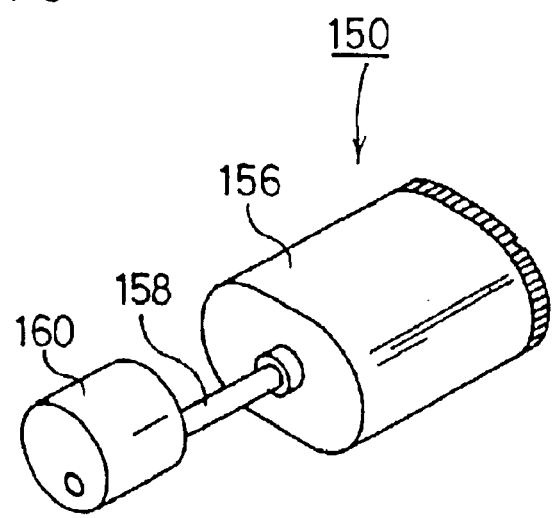
FIG. 6 is a perspective view of a response means comprising a motor and an eccentrically attached rotor, incorporated in the manual controller.

As shown in FIG. 6, the response means 150 comprises a motor 156 and a cylindrical rotor 160 mounted eccentrically on a rotatable shaft 158 of the motor 156. When the motor 156 is energized, the rotatable shaft 158 rotates to cause the rotor 160 to rotate in an eccentric motion for thereby producing vibrations, which are imparted as a physical effect to the user.

Figure 7:
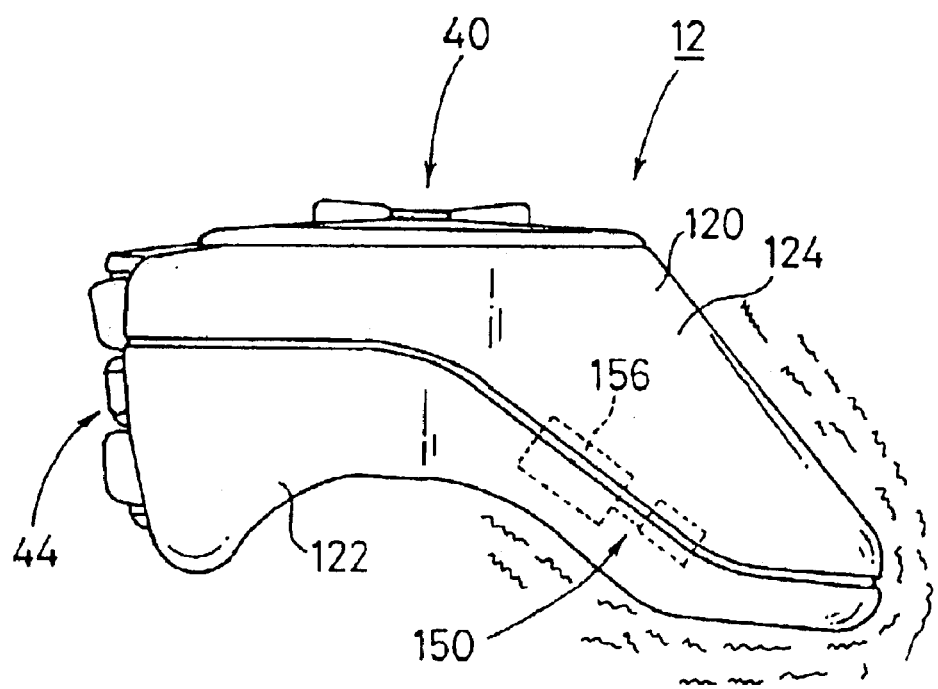
FIG. 7 is a right-hand side elevational view showing the manner in which the manual controller is vibrating.

In FIGS. 5 and 7, the vibrations produced by the response means 150 are transmitted to not only the first control support 124, but the lower case 122 and the upper case 120, for thereby vibrating the manual controller 12 in its entirety. The intensity and cyclic period of the vibrations can be changed depending on the rotational speed and torque of the motor 156, so that the intensity of operation of the response means 150 can be changed.

As shown in FIG. 5, the response means mount 152 in the lower case 122 is disposed on the bottom of a portion of the first control support 124 against which the user's hand abuts. The motor 156 of the response means 150 is fixedly mounted on the response means mount 152.

Figure 9:
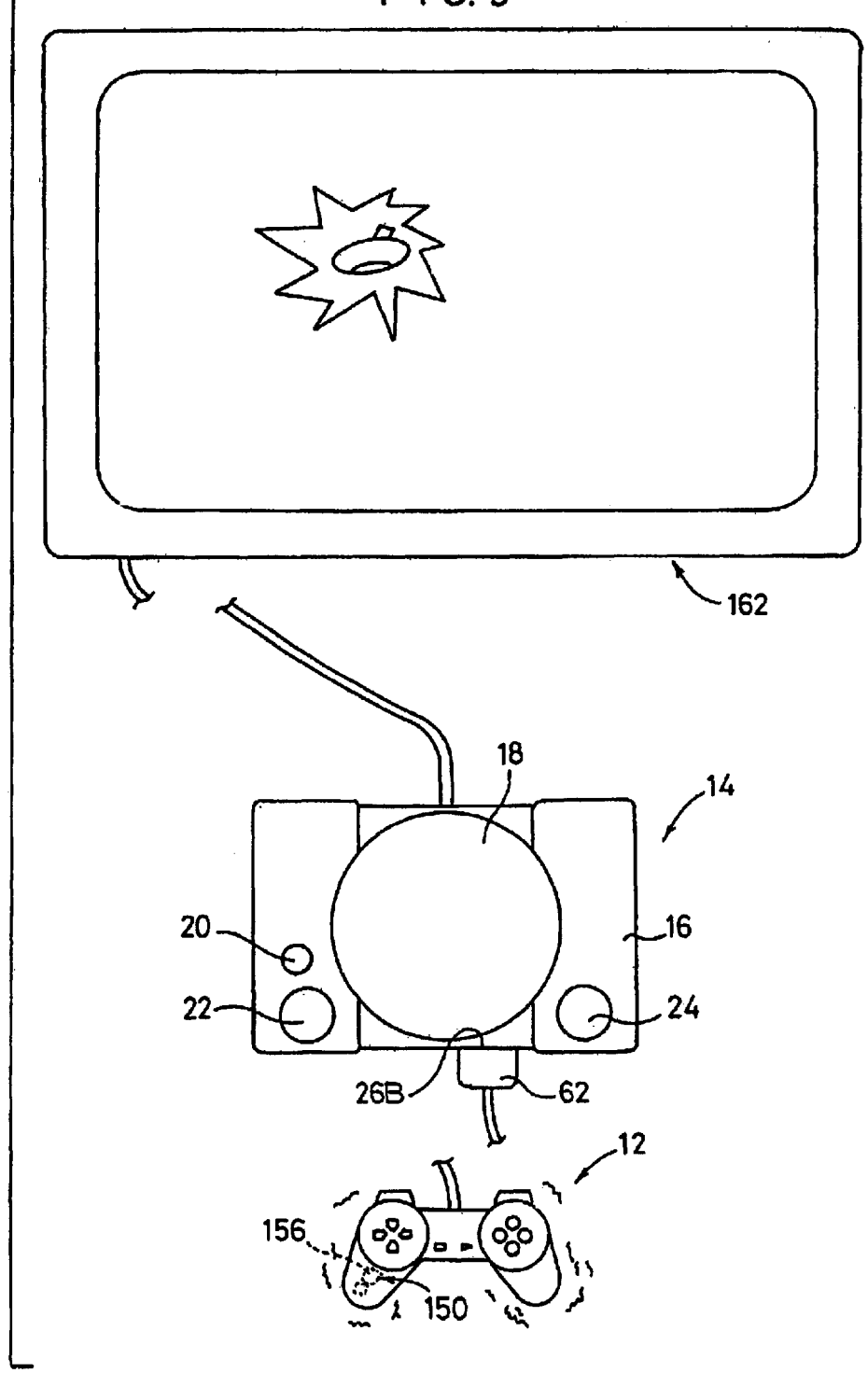
FIG. 9 is a view showing the manner in which the manual controller is connected to the entertainment apparatus, and the entertainment apparatus is connected to a display monitor to play a game.

With the response means 150 mounted in the first control support 124 in the lower case which can be gripped by the left hand of the user, the user who is playing the game receives vibrations at times or based on manual control actions depending on the type of the game, from the manual controller 12 connected to the entertainment apparatus 14 that is connected to a display monitor 162, as shown in FIG. 9.

For example, when the user knocks down an opponent or is attacked by an opponent in a combat game, or hits a target in a shooting game as shown in FIG. 9, or an airplane as a moving target is attacked in a game image, the entertainment apparatus 14 applies a certain response signal to the response means 150 to energize the motor 156 to vibrate the manual controller 12 in its entirety for a certain period of time.

In this manner, in response to a manual control action which the user has made on a certain control button on the manual controller 12, the manual controller 12 is vibrated in its entirety, and the vibrations are fed back as a physical sensation to the user, who then finds the game more realistic.

In order to actuate the response means 150 to vibrate the manual controller 12 in its entirety, the manual controller 12 and the entertainment apparatus 14 need to have a bidirectional communication function.

Figure 10:
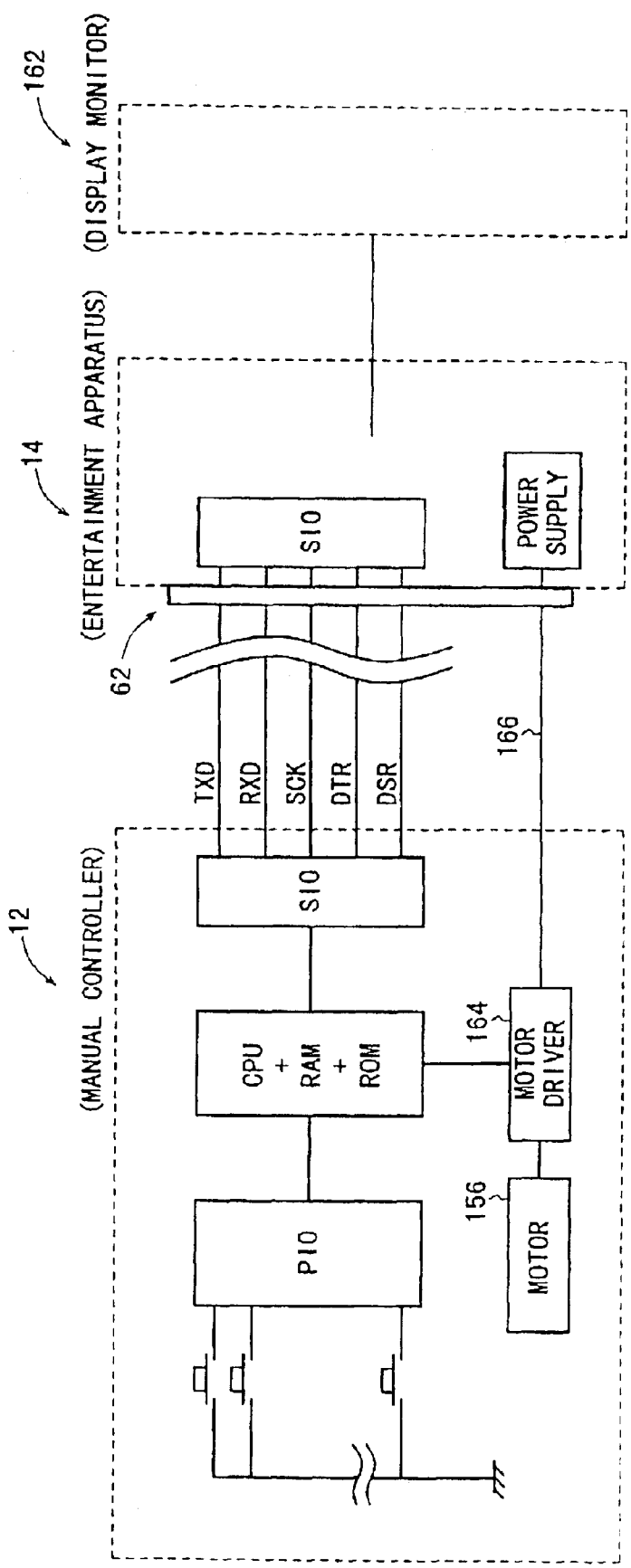
FIG. 10 is a block diagram of components for carrying out bidirectional communications between the manual controller and the entertainment apparatus.
Figure 11:
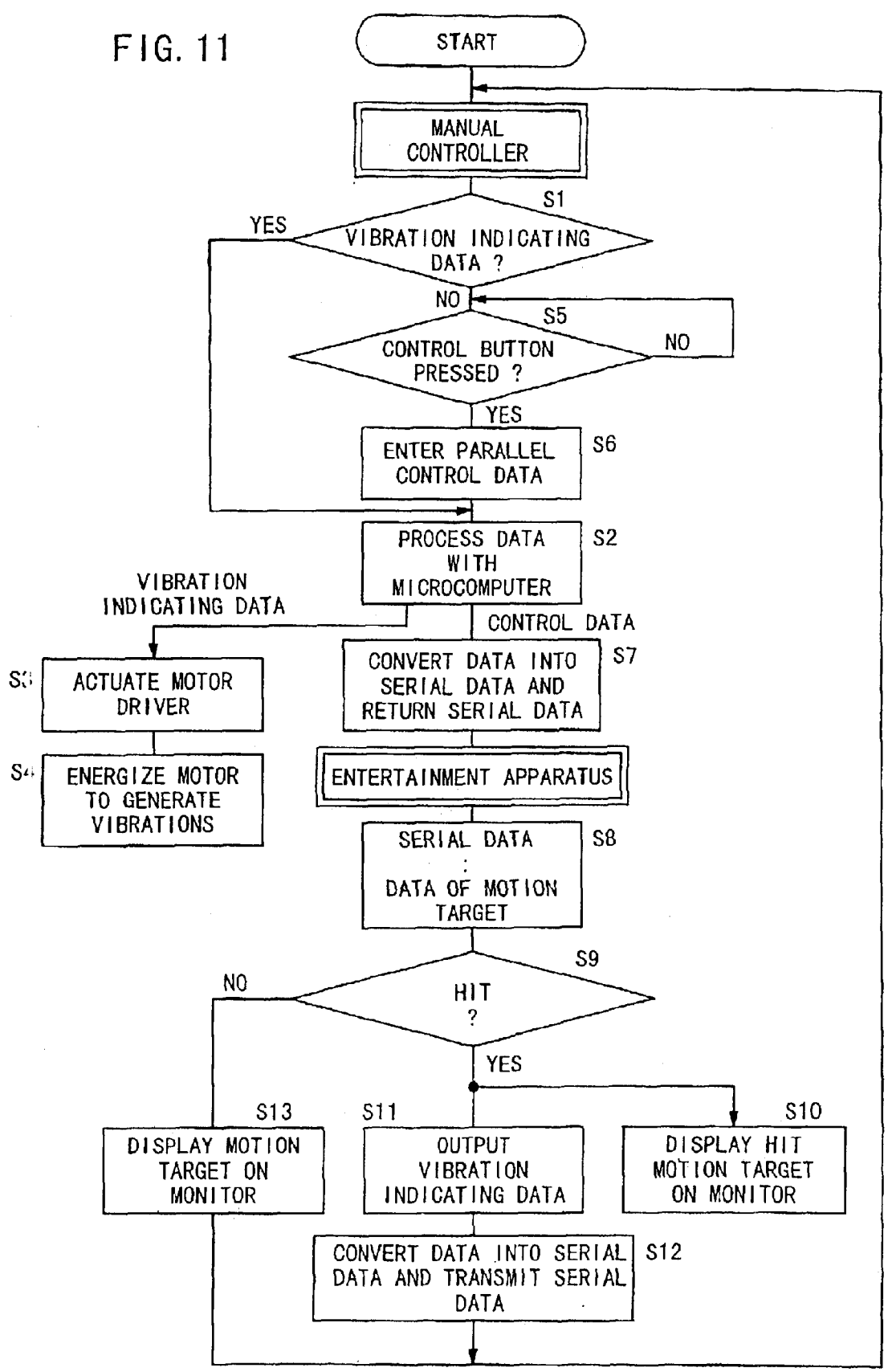
FIG. 11 is a flowchart of a process for processing, with a microcomputer, manual control data and vibration indicating data between the manual controller and the entertainment apparatus.

As shown in FIG. 10, such a bidirectional communication function can be performed by the connection terminal 62 connected to the entertainment apparatus 14 for bidirectional serial communication with the manual controller 12.

Specifically, an arrangement in the manual controller 12 for carrying out the bidirectional communication function comprises a serial I/O interface SIO for effecting serial communication with the entertainment apparatus 14, a parallel I/O interface PIO for entering control data from a plurality of control buttons, a one-chip microcomputer comprising a CPU, a RAM, and a ROM, and a motor driver 164 for energizing the motor 156 of the response means 150. The motor 156 is energized by a voltage and a current supplied from the motor driver 164.

An arrangement in the entertainment apparatus 14 for carrying out the bidirectional communication function comprises a serial I/O interface SIO for effecting serial communication with the manual controller 12. When the connection terminal 62 of the manual controller 12 is connected to the entertainment apparatus 14, the serial I/O interface SIO in the entertainment apparatus 14 is connected to the serial I/O interface SIO in the manual controller 12 via the connection terminal 62, making up a bidirectional communication means for bidirectional serial communication. Other details of the entertainment apparatus 14 are omitted from illustration in FIG. 10.

Signal and control lines for bidirectional serial communication include a data transfer signal line TXD (Transmit X' for Data) for sending data from the entertainment apparatus 14 to the manual controller 12, a data transfer signal line RXD (Received X' for Data) for sending data from the manual controller 12 to the entertainment apparatus 14, a serial synchronous clock signal line SCK (Serial Clock) for extracting data from the data transfer signal lines TXD, RXD, a control line DTR (Data Terminal Ready) for establishing and cutting off communication with the manual controller 12 as a terminal, and a flow control line DSR (Data Set Ready) for transferring a large amount of data.

The signal and control lines for bidirectional serial communication are accommodated in a cable. This cable further includes a power line 166 extending from a power supply in the entertainment apparatus 14 and connected to the motor driver 164 for supply electric energy to energize the motor 156.

A process of bidirectional serial communication between the manual controller 12 and the entertainment apparatus 14 will be described below. In order for the entertainment apparatus 14 to communicate with the manual controller 12 to read control data of the control buttons (button information) of the first, second, third, and fourth control pads 40, 42, 44, 46, the entertainment apparatus 14 first outputs selection data to the control line DTR. As a result, the manual controller 12 confirms that it is selected by the control line DTR, and then waits for a signal from the signal line TXD. Then, the entertainment apparatus 14 outputs an identification code indicative of the manual controller 12 to the data transfer signal line TXD. The manual controller 12 receives the identification code from the signal line TXD.

When the manual controller 12 recognizes the identification code, the manual controller 12 starts communicating with the entertainment apparatus 14. The entertainment apparatus 14 sends control data via the data transfer signal line TXD to the manual controller 12, which sends control data produced by a control button via the data transfer signal line RXD to the entertainment apparatus 14. In this manner, the entertainment apparatus 14 and the manual controller 12 perform bidirectional serial communication. The bidirectional serial communication will be finished when the entertainment apparatus 14 outputs selection stop data via the control line DTR.

With the bidirectional serial communication function, the manual controller 12 can send mainly control data of control buttons to the entertainment apparatus 14, and the entertainment apparatus 14 can send vibration indicating data for energizing the motor 156 of the response means 150 via the data transfer signal line TXD to the manual controller 12. The vibration indicating data for energizing the motor 156 has been established in advance in a CD-ROM set in the entertainment apparatus 14. Depending on the motion target for the user who plays the game, the entertainment apparatus 14 sends the vibration indicating data to the manual controller 12 to feed back vibrations for a certain period of time to the manual controller 12. Such a feedback process will be described below with reference to FIGS. 5, 10, and 11.

After the CD-ROM is loaded in the entertainment apparatus 14, the user presses the starter button 48 of the manual controller 12 shown in FIG. 5 to start the game, presses the selector button 50 to set up various functions, and then operates the first, second, third, and fourth control pads 40, 42, 44, 46 to play the game.

When the game starts, the microcomputer composed of the CPU, the RAM, and the ROM in the manual controller 12 shown in FIG. 10 monitors at all times whether the vibration indicating data is sent from the entertainment apparatus 14 via the serial I/O interface SIO. The vibration indicating data includes a control signal for a voltage and a current for energizing the motor 156 and a time for which to energize the motor 156.

If the data sent from the entertainment apparatus 14 includes the vibration indicating data while the game is in progress, then the motor driver 164 is actuated to apply the voltage supplied from the entertainment apparatus 14 to the motor 156 for a predetermined period of time.

Specifically, the microcomputer of the manual controller 12 recognizes the vibration indicating data in the data sent from the entertainment apparatus 14 in step S1, processes the vibration indicating data in step S2, actuates the motor driver 164 shown in FIG. 10 in step S3, and generates vibrations in step S4.

If no vibration indicating data is recognized in step S1 and then a control button is pressed in step S5, then control data from the control button is applied via the parallel I/O interface PIO to the microcomputer.

The microcomputer then processes the control data in step S2, converts the control data into serial data in step S7, and transmits the serial data via the serial I/O interface SIO to the entertainment apparatus 14.

When the entertainment apparatus 14 receives the serial data from the manual controller 12, the entertainment apparatus 14 compares data of a motion target and the received serial data in step S8, and determines a hit status in step S9. The hit status represents a status in which a hypothetical laser beam shot by the user hits a hypothetical target in motion, as shown in FIG. 9.

If the data of the motion target and the serial data agree with each other in step S9, i.e., if the motion target is hit, then the hit motion target is displayed on the display monitor 162 in step S10, and the vibration indicating data is outputted in step S11, after which the vibration indicating data is converted into serial data and the serial data is sent as a response signal via the serial I/O interface SIO to the manual controller 12 in step S12.

As described above in steps S1–S3, when the vibration indicating data is detected by the microcomputer of the manual controller 12, the motor driver 164 energizes the motor 156 to rotate the rotor 160 to vibrate the manual controller 12 in its entirety.

If the motion target is not hit in step S9, then a motion target based on a control button is displayed on the display monitor 162 in step S13, and a next operation is carried out when a control button of the manual controller 12 is pressed in step S5.

The vibration indicating data generated when the motion target is hit is received from the entertainment apparatus 14 as a response signal by the manual controller 12. However, the vibration indicating data may be sent from the entertainment apparatus 14 to the manual controller 12 by way of unidirectional communication.

A featuring function of the entertainment system 10, i.e., a function to give instructions to a physical effect applying means (parameters that the motor 156 in the manual controller 12 and the game program refer to), i.e., an effect application instructing function, will be described below.

A program for performing an effect application instructing function (an effect application instructing means 200, see FIG. 13) is downloaded from a certain CD-ROM played back by the entertainment apparatus 14 into the main memory 88 thereof, and executed on the entertainment apparatus 14.

Figure 12:
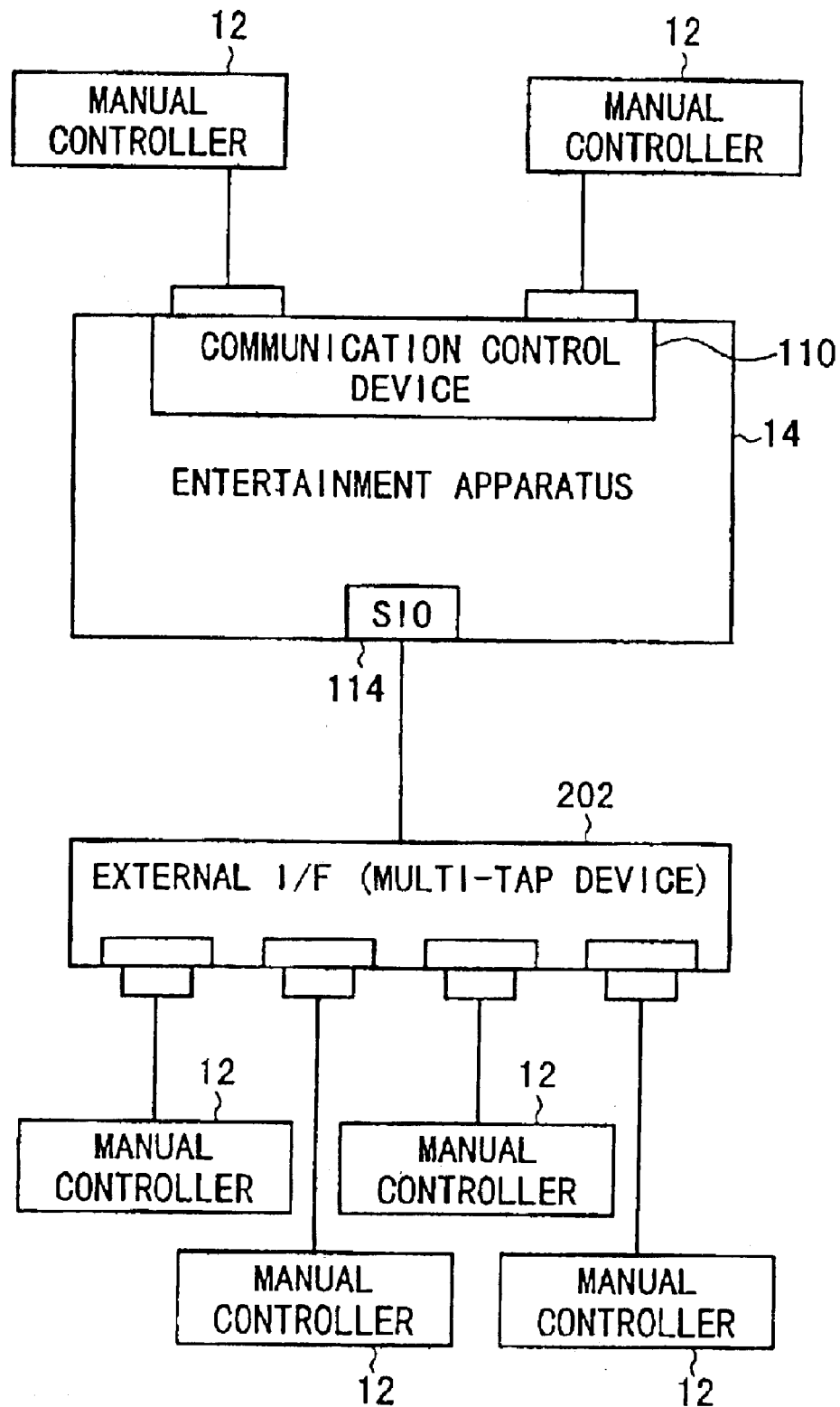
FIG. 12 is a block diagram showing an example in which manual controllers are connected to an entertainment apparatus.

As shown in FIG. 12, an external interface (e.g., a multi-tap device) 202 is connected to the entertainment apparatus 14 by an external terminal (e.g., a serial I/O) 114. The external interface 202 is capable of connecting a plurality of, e.g., four, manual controllers 12 simultaneously for allowing a plurality of users to enjoy a competition game, for example, on the entertainment apparatus 14.

The external interface 202 may instead be connected to the communication control device 110.

Figure 13:
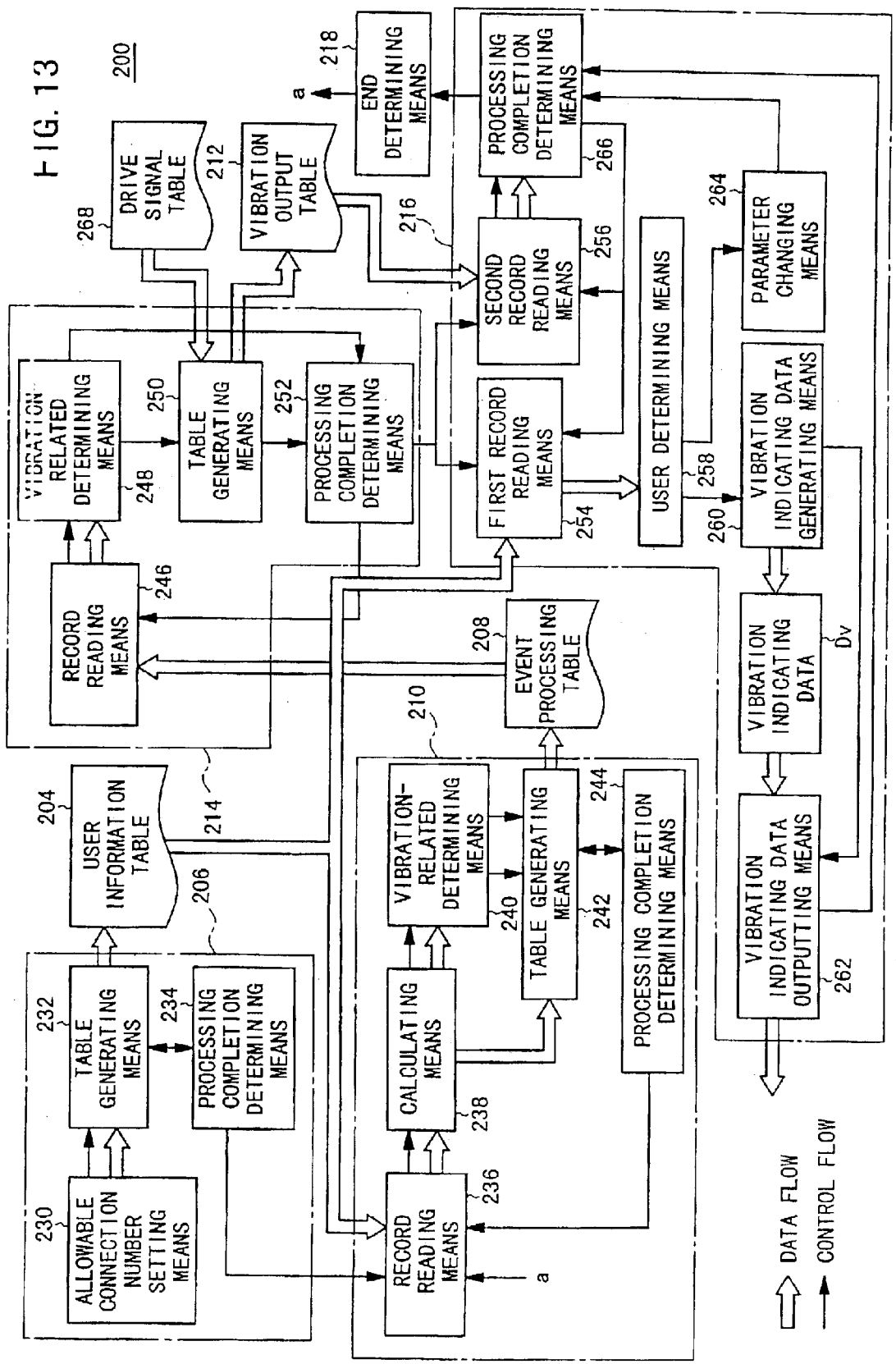
FIG. 13 is a functional block diagram of an effect application indicating means.

The arrangement of the effect application instructing means 200 will first be described below with reference to FIG. 13. As shown in FIG. 13, the effect application instructing means 200 comprises a user setting means 206 for setting up information as to users of the entertainment apparatus 14 to generate a user information table 204, an event processing means 210 for reading input information from one or more manual controllers 12 and processing data depending on the input information to generate an event processing table 208, a vibration setting means 214 for extracting only information relative to vibrations from the event processing table 208 and successively registering vibrations types with respect to the user to which vibrations are to be applied in a vibration output table 212, a vibration outputting means 216 for generating and outputting vibration indicating data Dv including a vibration type with respect to the user to which vibrations are to be applied, based on the vibration output table 212 and the user information table 204, and executing a physical effect to be applied to a hypothetical user as a parameter change, and an end determining means 218 for determining whether the game has ended or not.

The user setting means 206 scans the external interface 202 and the communication control device 110 (see FIG. 12) to read the number of a port (port number) of the external interface 202 to which the manual controller 12 is connected and the number of a port (port number) of the communication control device 110 to which the manual controller 12 is connected.

Two ports of the communication control device 110 may be designated by port numbers 1, 2, and a plurality of ports of the external interface 202 may be designated by port numbers 3, 4, 5, 6, . . . .

If a plurality of users who use the entertainment apparatus 14 are numbered, then such user numbering is advantageous for software construction. For example, the users of manual controllers 12 connected to the communication control device 110 may be successively numbered, and then the users of manual controllers 12 connected to the external interface 202 may be successively numbered in port number order.

Specifically, as shown in FIG. 12, if two manual controllers 12 are connected to the communication control device 110, and four manual controllers 12 are connected to the external interface 202, then the two users of the two manual controllers 12 connected to the communication control device 110 are allotted user numbers 1, 2, and the four users of the four manual controllers 12 connected to the external interface 202 are allotted user numbers 1, 2, 3, 4 in port number order.

If one manual controller 12 is connected to the communication control device 110, and three manual controllers 12 are connected to the external interface 202, then the user of the manual controller 12 connected to the communication control device 110 is allotted user number 1, and the three users of the three manual controllers 12 connected to the external interface 202 are allotted user numbers 3, 4, 5, 6 in port number order.

If three manual controllers 12 are connected to only the external interface 202, then the three users of the three manual controllers 12 connected to the external interface 202 are allotted user numbers 1, 2, 3 in port number order.

A user of the manual controller is a human being and can be defined as an actual user. If a competition game is played, then an opponent may be a computer, and such a computer may be defined as a hypothetical user. Since the concept of a port number described above is not applicable to such a hypothetical user, it is convenient to use a special code indicative of the computer. Furthermore, the user number of a hypothetical user may be a number following the user number of an actual user.

Details of the various tables will be described below based on the above definition. As shown in FIG. 14, the user information table 204 has port numbers or codes (codes indicative of hypothetical users) are registered in respective records. Record numbers of the user information table 204 correspond to user numbers. For example, the number of the port (port number) to which the manual controller 12 used by an actual user to which the user number 1 is assigned is registered in record 1.

As shown in FIG. 15, the event processing table 208 stores, in each record, a processing type (e.g., vibrations) based on input data from the manual controller 12 and a decision of the computer, a user number of an actual user to which vibrations are to be applied, and a code indicative of a control attribute, e.g., type of a control key (○,Δ,□, X, or their combination). If the processing type is not related to vibrations, then the result of calculations based on input data from the manual controller 12 or the result of calculations based on a decision of the computer is stored as a control attribute.

As shown in FIG. 16, the vibration output table 212 stores one or more vibration types based on control key types in each record. FFH (hexadecimal), for example, may be used as an initial value (invalid value).

FIG. 17 shows, by way of example, a drive signal table 268 indicating details of vibration types. A vibration type 1 corresponding to the control key ○ indicates that the motor 156 in the manual controller 12 be energized at a predetermined rotational speed. A vibration type 2 corresponding to the control key X indicates that the rotational speed of the motor 156 be varied in constant cyclic periods. A vibration type 3 corresponding to the control key □ indicates that the rotational speed of the motor 156 be varied at random. A variation type 4 corresponding to the control key Δ indicates that the rotational speed of the motor 156 be intermittent.

Furthermore, a vibration type 5 corresponding to the control keys ○+X (the control keys ○, X are simultaneously pressed) indicates that the motor 156 be energized at a predetermined rotational speed in constant cyclic periods.

The various processing means, described above, of the effect application instructing means 200 will be described below with reference to FIG. 13.

The user setting means 206 comprises an allowable connection number setting means 230 for detecting whether the external interface 202, etc. is connected or not to set up an allowable number of manual controllers 12 that can be connected, a table generating means 232 for detecting whether the manual controller 12 is connected or not and whether there is a hypothetical user or not to generate the user information table 204, and a processing completion determining means 234 for determining the completion of a user setting process.

The event processing means 210 comprises a record reading means 236 for successively reading records from the user information table 204, a calculating means 238 for detecting input data of a manual controller 12 operated by an actual user, effecting calculations based on the detected input data, and effecting calculations based on the result of a decision made by the computer, a vibration-related determining means 240 for determining whether the result of calculations is vibration-related or not, a table generating means 242 for, if the result of calculations is vibration-related, registering a code relative to vibrations, a user number found by the calculations, and a control attribute in the record in the event processing table 208, and if the result of calculations is otherwise, registering a type code depending on a request and the result of calculations in record in the event processing table 208 for thereby generating the event processing table 208, and a processing completion determining means 244 for determining the completion of an event processing process.

The vibration setting means 214 comprises a record reading means 246 for successively reading records from the event processing table 208, a vibration-related determining means 248 for determining whether a processed type is vibration-related or not, a table generating means 250 for generating the vibration output table 212 based on various information registered in the read records, and a processing completion determining means 252 for determining the completion of a vibration setting process.

The vibration outputting means 216 comprises a first record reading means 254 for successively reading records from the user information table 204, a second record reading means 256 for successively reading records from the vibration output table 212, a user determining means 258 for determining whether a party to which an effect is to be applied is an actual user or a hypothetical user, a vibration indicating data generating means 260 for generating vibration indicating data Dv to be transferred to the manual controller 12 if the user determining means 258 determines whether a party to which an effect is to be applied is an actual user, a vibration indicating data outputting means 262 for outputting the generated vibration indicating data Dv to the manual controller 12, a parameter changing means 264 for changing the numerical value of a physical parameter referred to by the game program if the user determining means 258 determines whether a party to which an effect is to be applied is a hypothetical user, and a processing completion determining means 266 for determining the completion of a vibration outputting process.

A processing operation of the effect application instructing means (program) 200, e.g., a processing operation of the effect application instructing means 200 that operates with the game program of a competition game, will be described below with reference to FIGS. 18 through 24.

Figure 18:
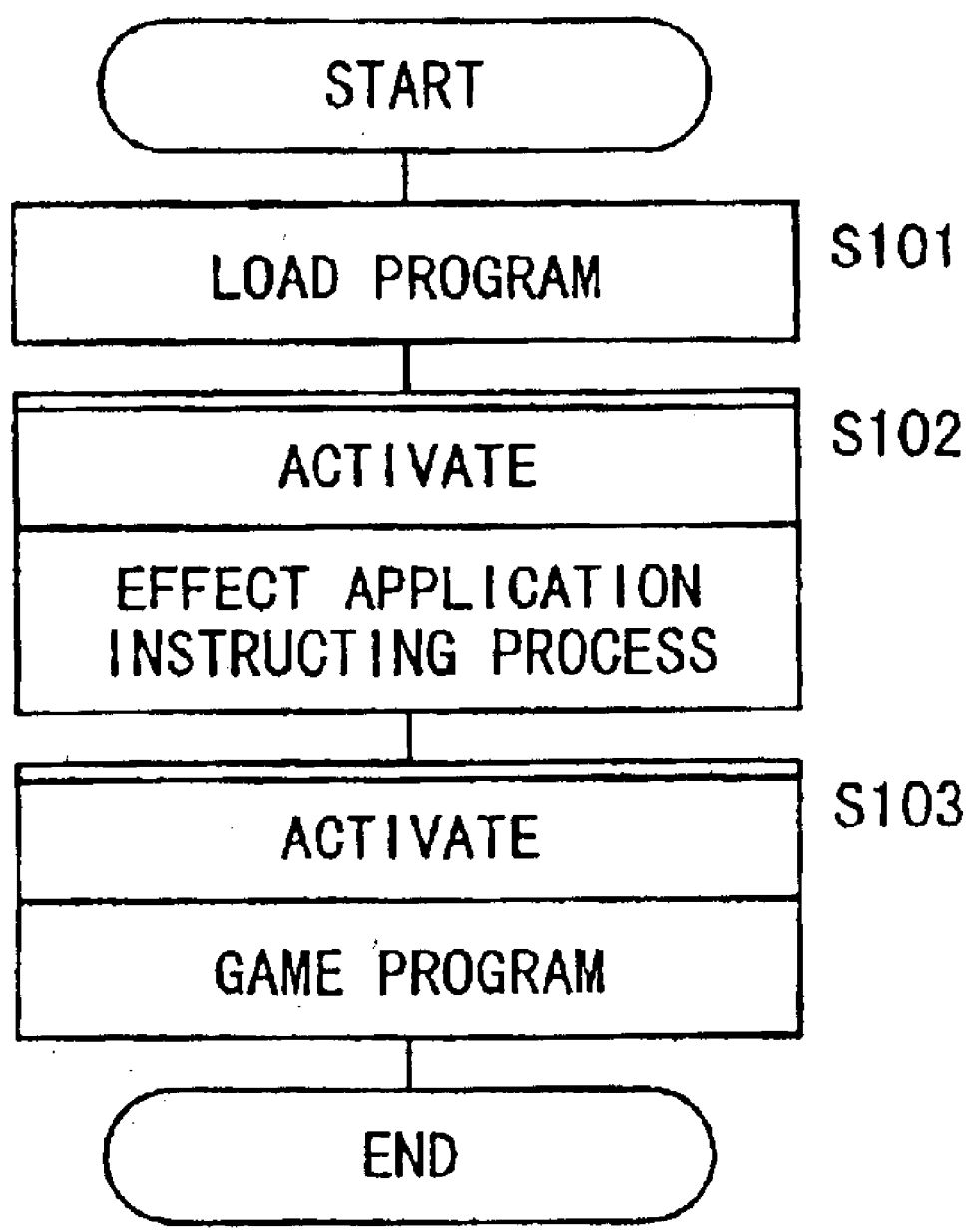
FIG. 18 is a flowchart of a processing sequence of the effect application indicating means (program) that operates with a game program for a competition game.

In step S101 in FIG. 18, the game program of a competition game and the effect application instructing means (program) 200 are read from a certain CD-ROM and transferred to the main memory 88 of the entertainment apparatus 14. The effect application instructing means 200 is activated in step S102, and the game program is activated in step S103. The effect application instructing means 200 is designed to operate in a time sharing fashion with respect to the game program.

Figure 19:
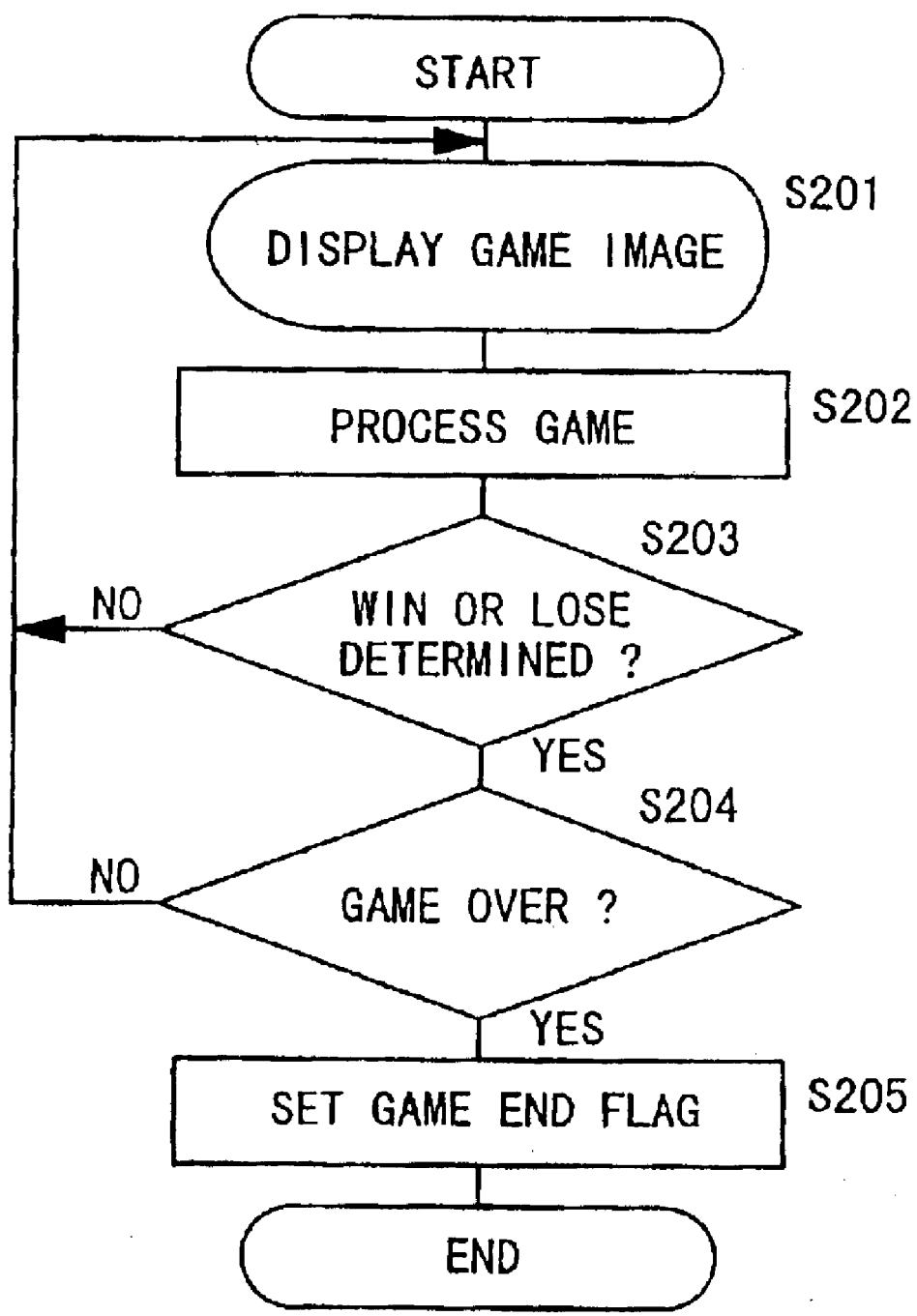
FIG. 19 is a flowchart of a processing sequence of the game program.

The game program operates as follows: As shown in FIG. 19, a game image is displayed in step S201. Then, in step S202, the competition game is processed, successively processing input data set from the manual controller 12, and displaying images and changing various parameters depending on the input data.

In step S203, it is determined whether a decision as to the user's winning or losing has been made or not. If no such decision has been made, control goes back to step S201 in which competition game is processed. If a decision has been made, control proceeds to step S204 which determines whether the game has been over or not. If the game has not been over, then control returns to step S201 in which competition game is processed. If the game has been over, then a game end flag is set in step S205, and the game program is finished.

Figure 20:
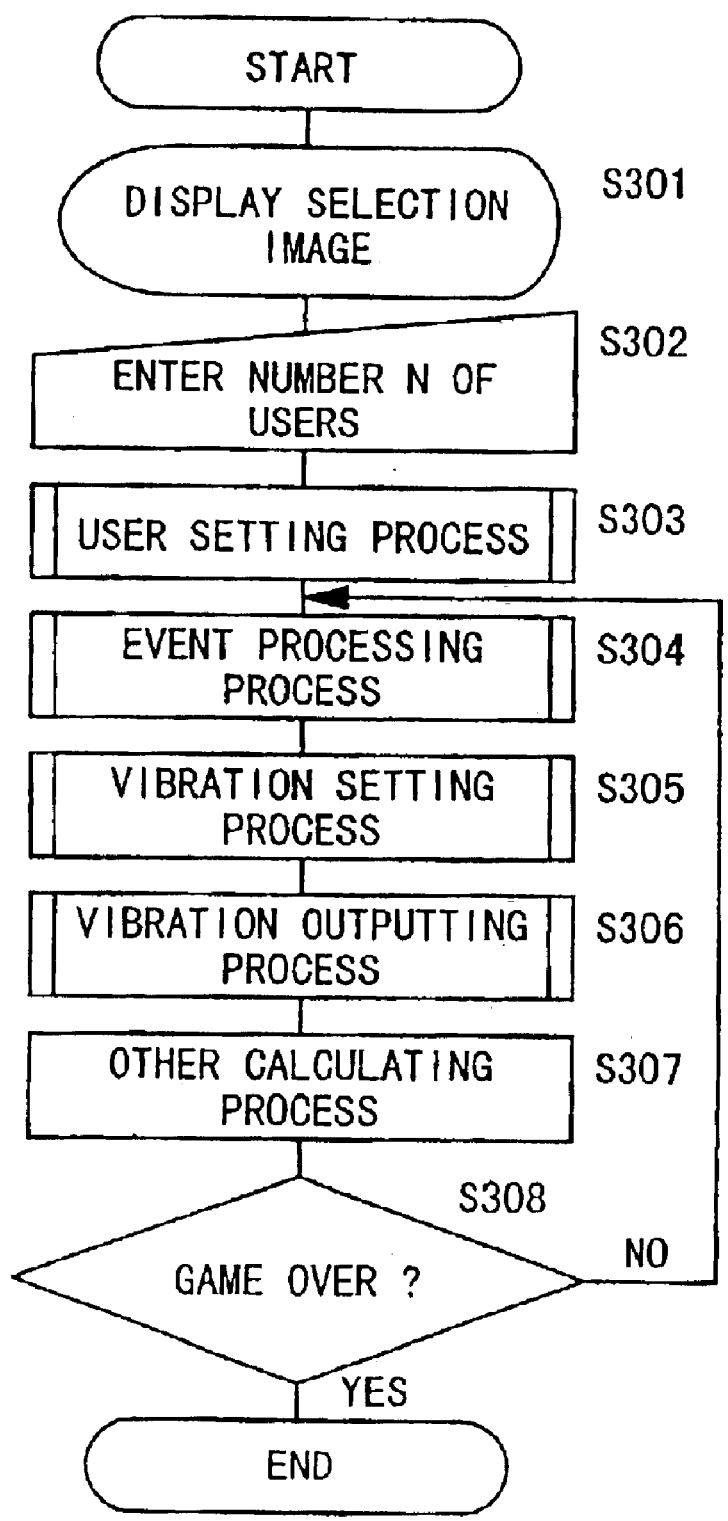
FIG. 20 is a flowchart of a processing sequence of the effect application indicating means.

The effect application instructing means 200 operates as follows: As shown in FIG. 20, a selection image is displayed in step S301. The selection image displays a message prompting a user to enter the number of users (actual user and hypothetical user) to take part in the competition game and a frame for indicating a numerical value representing the number of users in response to an inputted manual control action.

In step S302, a user enters the number of users (actual user and hypothetical user) to take part in the competition game via either one of a plurality of manual controllers 12 connected to the entertainment apparatus 14.

In step S303, a user setting process is carried out. The user setting process is performed by the user setting means 206 shown in FIG. 13 to set up information as to users of the entertainment apparatus 14, thus generating a user information table 204.

After the user setting process, an event processing process is carried out in step S304. The event processing process performed by the event processing means 210 shown in FIG. 13 to read input information from one or more manual controllers 12, and process data depending on the input information to generate an event processing table 208.

After the event processing process, a vibration setting process is carried out in step S305. The vibration setting process is performed by the vibration setting means 214 shown in FIG. 13 to extract only information relative to vibrations from the event processing table 208 and successively register vibrations types with respect to the user to which vibrations are to be applied in a vibration output table 212.

After the vibration setting process, a vibration outputting process is carried out in step S306. The vibration outputting process is performed by the vibration outputting means 216 to generate and output vibration indicating data Dv including a vibration type with respect to the user to which vibrations are to be applied, based on the user information table 204 and the vibration output table 212, and execute a physical effect to be applied to a hypothetical user as a parameter change.

After the vibration outputting process, other calculations are carried out in step S307. In step S308, the end determining means 218 determines whether the game has ended or not based on the game end flag. If the game has not ended, then control goes back to step S304 to carry out again the even processing process, the vibration setting process, the vibration outputting process, and other calculations.

If the game has ended in step S308, the effect application instructing process is finished.

The user setting process in step S303, the event processing process in step S304, the vibration setting process in step S305, and the vibration outputting process in step S306 will successively be described below with reference to FIGS. 21 through 24.

Figure 21:
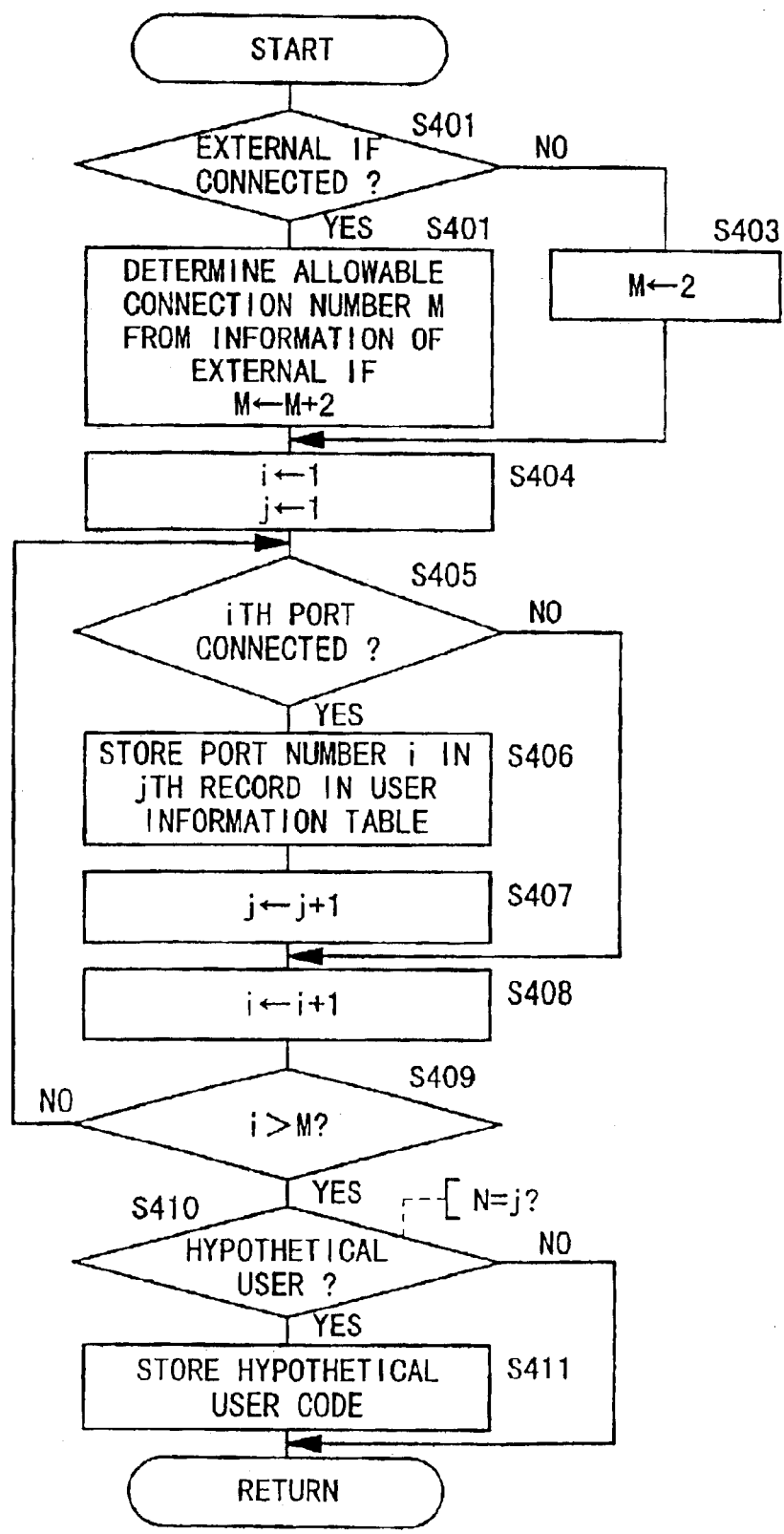
FIG. 21 is a flowchart of a processing sequence of a user setting means.

In the user setting process, the allowable connection number setting means 230 detects whether the external interface 202 is connected or not in step S401 shown in FIG. 21 by referring to a status flag indicative of a hardware connection status, for example.

If the external interface 202 is connected, then control goes to step S402 in which the allowable connection number setting means 230 determines an allowable connection number M from the type (ID or the like) of the external interface 202. If manual controllers 12 connected to the communication control device 110 can also be used, then "2", for example, which represents an allowable connection number for the manual controllers 12 connected to the communication control device 110, is added to the allowable connection number M.

If the external interface 202 is not connected, then control goes to step S403 in which the allowable connection number setting means 230 "2", for example, which represents an allowable connection number for the manual controllers 12 connected to the communication control device 110 is defined as the allowable connection number M.

After step S402 or S403, control proceeds to step S404 in which an initial value "1" is stored in an index register i used to search for ports of the external interface 202 and the communication control device 110 and an initial value "1" is stored in an index register j used to search for records in the user information table 204.

In step S405, the table generating means 232 detects whether the manual controller 12 is connected to an ith port or not. If the manual controller 12 is connected, then control goes to step S406 in which the table generating means 232 stores a port number i in a jth record in the user information table 204. In step S407, the value of the index register j is incremented by +1.

After step S407, or if the manual controller 12 is not connected to the ith port, control goes to step S408 in which the value of the index register i is incremented by +1.

In step S409, the processing completion determining means 234 determines whether all the port numbers at which the manual controllers 12 are connected have been registered in the user information table 204 or not by determining whether the value of the index register i is greater than the allowable connection number M or not.

If the value of the index register i is not greater than the allowable connection number M, indicating that the process has not yet been completed, then control returns to step S405 and repeats step S405 and following steps. If all the port numbers at which the manual controllers 12 are connected have been registered in the user information table 204, then control proceeds to step S410 in which the table generating means 232 determines whether there is a hypothetical user or not by determining whether the value of the index register j is the same as the number N of users or not.

If the value of the index register j is the same as the number N of users, indicating that there is a hypothetical user, then control goes to step S411 in which the table generating means 232 stores a code indicative of the hypothetical user in the jth record in the user information table 204.

After step S411 or if there is no hypothetical user in step S410, then the user setting process is finished.

Figure 22:
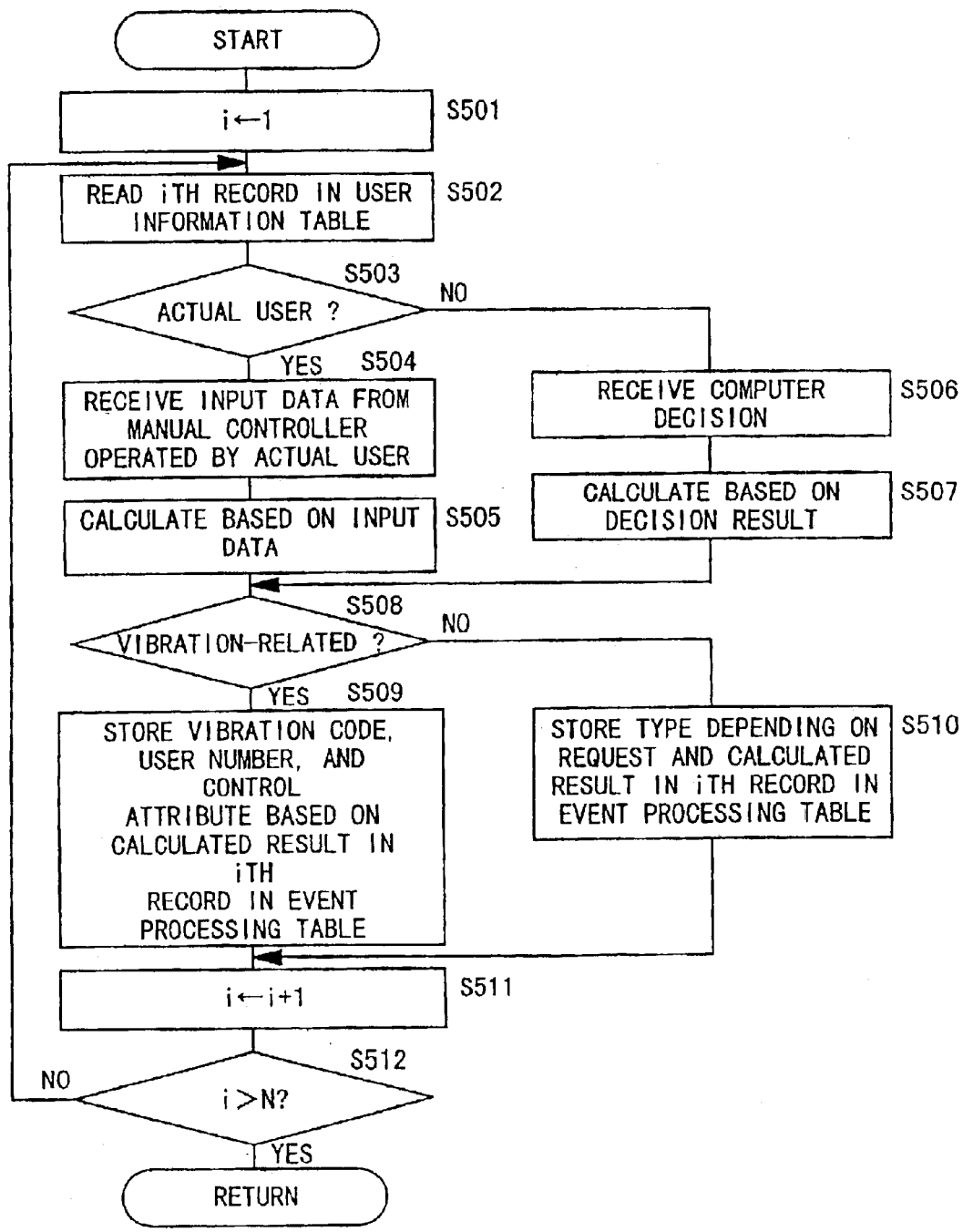
FIG. 22 is a flowchart of a processing sequence of an event processing means.

In the event processing process, an initial value "1" is stored in the index register i which is used to search for records in the user information table 204 and the event processing table 208 in step S501 shown in FIG. 22.

Then, in step S502, the record reading means 236 reads details of an ith record in the user information table 204.

In step S503, the calculating means 238 determines whether the details of the ith record belong to an actual user or not by determining whether the details of the ith record are a code indicative of a hypothetical user or not.

If the details of the ith record are not a code indicative of a hypothetical user, but are related to an actual user, then control goes to step S504 in which the calculating means 238 receives input information from the manual controller 12 that is connected to a port (of the external interface 202 or the communication control device 110) corresponding to the port number stored in the ith record.

Thereafter, in step S505, the calculating means 238 calculates the received input information to determine what manual control action has been made.

If the details of the ith record indicate a hypothetical user in step S503, control goes to step S506 in which the calculating means 238 receives a decision (calculated result) from the computer. Then, in step S507, the calculating means 238 calculates the decision result of the computer to determine what decision has been made by the computer.

If the information produced by the calculation in step S505 and step S507 is related to vibrations, then the information represents a code related to vibrations, the number of a user (user number) to which vibrations are to be applied, and the type of the control button (control attribute).

After step S505 or step S507, control goes to step S508 in which the vibration-related determining means 240 determines whether the present control action or the decision result is vibration-related or not.

If it is vibration-related, then control goes to step S509 in which the table generating means 242 stores the code related to vibrations, the user number, and the control attribute based on the calculated result in the ith record in the event processing table 208.

If it is not vibration-related in step S508, then control goes to step S510 in which the table generating means 242 stores a type code depending on the request and the calculated result in the ith record in the event processing table 208.

After step S509 or step S510, control goes to step S511 in which the value of the index register i is incremented by +1. Thereafter, the processing completion determining means 244 determines whether the present control action or the decision result has been registered in the event processing table 208 or not with respect to all users registered in the user information table 204 by determining whether the. value of the index register i is greater than the number N of users or not.

If the value of the index register i is not greater than the number N of users, indicating that the process has not yet been completed, then control returns to step S502 and repeats step S502 and following steps. If the present control action or the decision result has been registered in the event processing table 208 with respect to all registered users, then the even processing process is finished.

Figure 23:
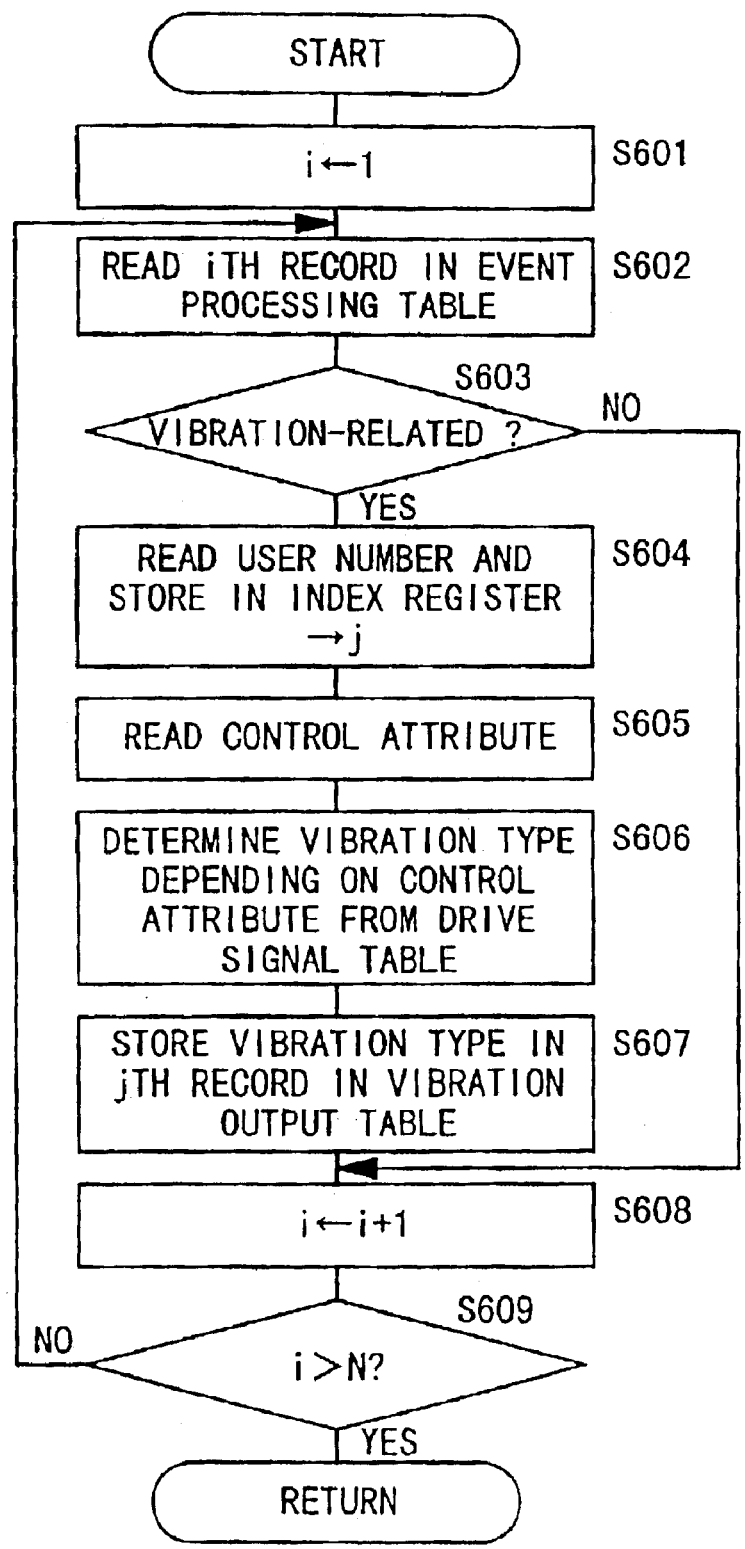
FIG. 23 is a flowchart of a processing sequence of a vibration setting means.

In the vibration setting process, an initial value "1" is stored in the index register i which is used to search for records in the event processing table 208 in step S601 shown in FIG. 23.

Then, in step S602, the record reading means 246 reads details of an ith record in the event processing table 208, i.e., the control details or decision details of the user corresponding to the user number i.

In step S603, the vibration-related determining means 248 for determines whether the control action or decision detail is vibration-related or not by determining whether a code related to vibrations is recorded in the details of the ith record or not.

If the control action or decision detail is vibration-related, then control goes to step S604 in which the table generating means 250 reads the user number registered in the ith record and stores the user number in the index register j used to search for records in the vibration output table 212.

In step S605, the table generating means 250 reads the control attribute registered in the ith record and determines a vibration type corresponding to the control attribute from the drive signal table 268.

In step S607, the table generating means 250 registers the determined vibration type in the jth record in the vibration output table 212. At this time, the vibration type with respect to the user to which vibrations are to be imparted has been registered.

After step S607 or if the control action or decision detail is not vibration-related in step S603, control goes to step S608 in which the value of the index register i is incremented by +1. Thereafter, in step S609, the processing completion determining means 252 determines whether all information related to vibrations, of the information registered in the event processing table 208, has been registered in the vibration output table 212. by determining whether the value of the index register i is greater than the number N of users or not.

If the value of the index register i is not greater than the number N of users, indicating that the process has not yet been completed, then control returns to step S602 and repeats step S602 and following steps. If the present information related to vibrations has been registered in the vibration output table 212, then the vibration setting process is finished.

Figure 24:
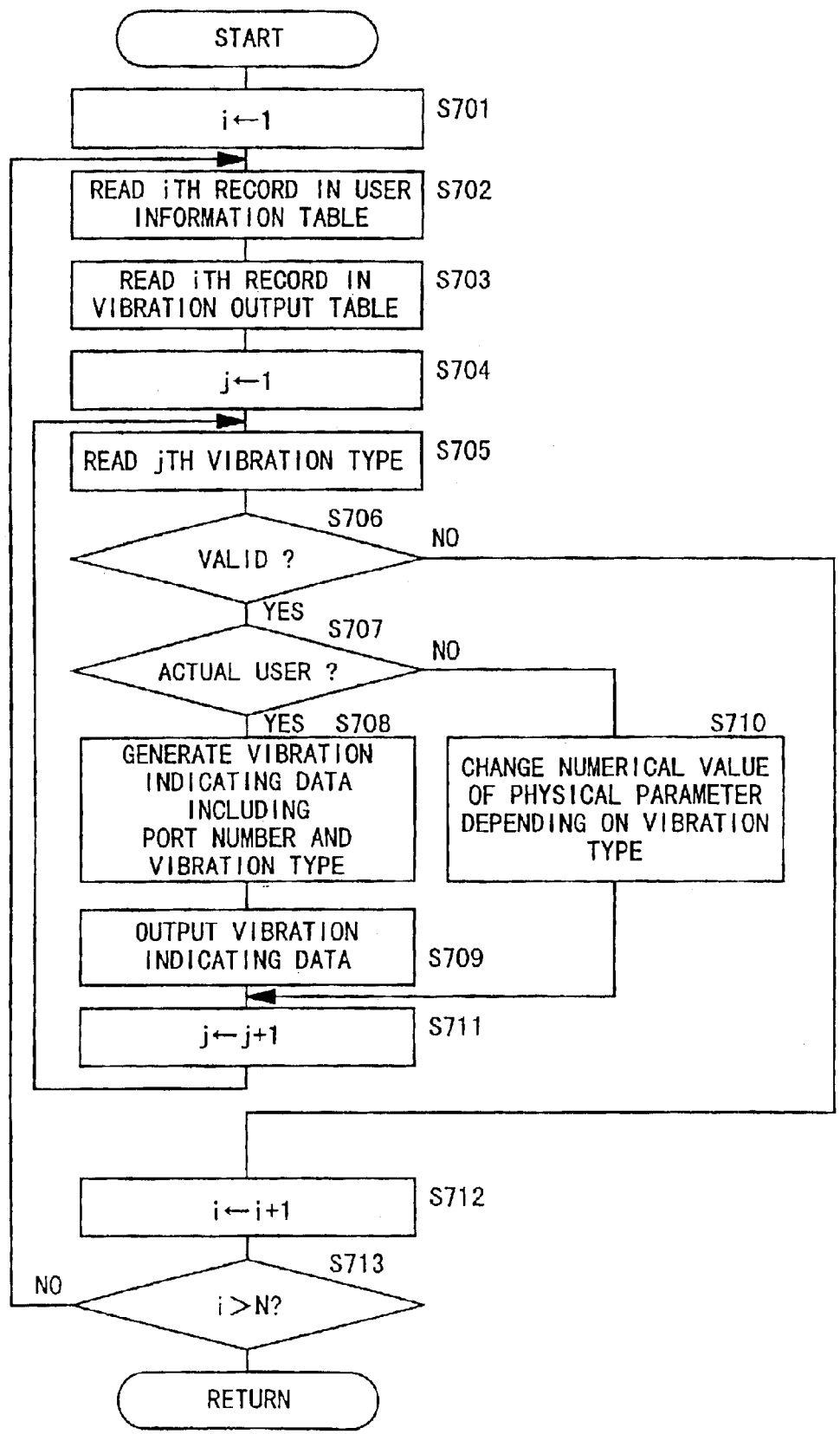
FIG. 24 is a flowchart of a processing sequence of a vibration outputting means.

In the vibration outputting process, an initial value "1" is stored in the index register i which is used to search for records in the vibration output table 212 in step S701 shown in FIG. 24.

Then, in step S702, the first record reading means 254 reads details of the ith record in the user information table 204, i.e., a port number corresponding to the user number i or a code indicative of a hypothetical user.

In step S703, the second record reading means 256 reads details of an ith record in the vibration output table 212, i.e., a port number to be given to the user corresponding to the user number i or a code indicative of a hypothetical user.

In step S704, an initial value "1" is stored in the index register j which is used to search for vibration types. Thereafter, in step S705, a jth vibration type is read from the jth record in the vibration output table 212.

In step S706, it is determined whether the read vibration type is valid or not by determining whether the read vibration type is FFH that indicates invalidity.

If the vibration type is not FFH, but valid, then control goes to step S707 in which the user determining means 258 determines whether the user to which vibrations are to be imparted is an actual user or not by determining whether the details registered in the ith record in the user information table 204 are a code indicative of a hypothetical user or not.

If the details registered in the ith record in the user information table 204 are not a code indicative of a hypothetical user, but indicate an actual user, then the vibration indicating data generating means 260 generates vibration indicating data Dv including a port number registered in the ith record in the user information table 204 and information as to the present vibration type in step S708. The information as to the present vibration type includes a control signal for a voltage and a current for energizing the motor 156 depending on the vibration type and a time for which the motor 156 is to be energized.

In step S709, the vibration indicating data outputting means 262 outputs the generated vibration indicating data Dv. The external interface 202 and the communication control device 110 monitor the outputted vibration indicating data Dv at all times, and deliver the vibration indicating data Dv to the manual controller 12 connected to a port corresponding to the port number registered in the vibration indicating data Dv.

The manual controller 12 which has received the vibration indicating data Dv from the entertainment apparatus 14 energizes the motor 156 based on the information as to the vibration type stored in the vibration indicating data Dv, imparting vibrations depending on the vibration type to the actual user who is operating the manual controller 12.

If the user to which vibrations are to be imparted is a hypothetical user in step S707, then control goes to step S710 in which the parameter changing means 264 changes the numerical value of a parameter depending on the vibration type, of physical parameters referred to by the game program. For example, the value of a parameter relative to an operation speed on the display screen or a status decision capability is changed.

After step S709 or step S710, control goes to step S711 in which the value of the index register j is incremented by +1. Control then returns to step S705 in which a next vibration type is read from the jth record in the vibration output tale 212, and the processing depending on the vibration type is carried out.

If the vibration type is invalid in step S706, then control goes to step S712 in which the value of the index register i is incremented by +1. In step S713, the processing completion determining means 266 determines whether all the process has been completed with respect to the vibration types registered in the vibration output table 212 by determining whether the value of the index register i is greater than the number N of users or not.

If the value of the index register i is not greater than the number N of users, indicating that the process has not yet been completed, then control returns to step S703. Information as to a next user and a vibration type to be imparted to the user are read, and vibrations depending on the vibration type are applied to an actual user or the value of a physical parameter of a hypothetical user is changed. When all the process has been completed with respect to the vibration types registered in the vibration output table 212, the vibration outputting process is completed.

In the entertainment system 10 according to the present invention, the manual controller 12 operated by a selected one of a plurality of users incorporates the effect application instructing means 200 for outputting instructions to generate a physical effect (vibrations, etc.) based on a request from another user. Therefore, when a selected user makes a certain control action with the manual controller 12 while viewing the screen of the television receiver, a physical effect can be applied to the selected user based on a request from another user.

At this time, the selected user may enter an erroneous control action or have to interrupt a control action or encounter an unexpected situation because of the sudden application of the physical effect.

Consequently, in addition to a physical effect as a response to a control action made by the user while a competition game is in progress, a physical effect can be imparted to the user based on a request from another user. Such a physical effect makes it possible for the game to develop into unexpected situations, which tend to render the competition game highly realistic.

In the illustrated embodiment, if the selected user is an actual user, i.e., a human being, the response means 150 in the manual controller 12 operated by the actual user is instructed to impart vibrations to the actual user. Therefore, while a competition game is being played by a plurality of users, the manual controller 12 operated by one of the users may be vibrated by the intention of another user, thus physically interfering with control actions of the user thereby to making it difficult for the user to enter control actions or induce erroneous control actions.

As a result, the users can play more realistic competition games than heretofore. Since each of the users does not know when its control actions may be interfered with by others, the users may feel thrilled with the game being played, and the game may have unexpected developments.

Furthermore, if the selected user is a hypothetical user, i.e., a computer, then a physical parameter of the hypothetical user is affected. Since a hypothetical user is a hypothetical entity (character), it does not actually use a manual controller 12. Therefore, the value of a parameter relative to an operation speed on the display screen or a status decision capability of the hypothetical user is affected. Consequently, a game where a computer serves as an opponent, which tends to be uninteresting and dull, may be develop into realistic aspects.

Moreover, the user setting means 206 is incorporated for detecting the number of manual controllers 12 connected to the entertainment apparatus 14 and identification data (port numbers) of the manual controllers 12 are detected, and setting up user information depending on the detected number of manual controllers 12. Therefore, it is possible to accurately recognize a user (actual user or hypothetical user) who has issued a request to impart a physical effect to a selected user. A physical effect can thus be applied reliably to a selected user.

If a request from a user is an instruction to apply a physical effect to a selected user, i.e., an instruction to impart vibrations to a selected user, then the type (vibration type, etc.) of the physical effect to be imparted to the selected user is established depending on details of the request (control attribute, etc.). If vibration are applied as the physical effect to the selected user, then the physical effect depending on the vibration type can be applied. For example, highly frequent vibrations, moderate vibrations, or less frequent vibrations may be imparted as desired to the selected user, thereby allowing the game to have realistic developments.

Although a certain preferred embodiment of the present invention has been shown and described in detail, it should be understood that various changes and modifications may be made therein without departing from the scope of the appended claims.

What is claimed is:

1. An entertainment system comprising:

an entertainment apparatus for executing a game program; and a manual controller including at least one manual control switch, said manual controller entering a manual control command based on operation of said manual control switch by a player into said entertainment apparatus, said manual controller further including at least one vibration generator for generating vibrations based on a request from entertainment apparatus, wherei said entertainment apparatus includes:

a first means for determining a target player based on said manual control command from said manual controller;

a second means for making a command for generating vibrations when said manual control command indicating said vibrations to be applied to said target player is entered, said second means makeing said command independently from motion of said target player;

a third means for sending said command of said second means to said vibration generator of another manual contrller if said target player selected by said first means is a human user; and a fourth means for changing a numerical value of a parameter regarding a hypothetical character corresponding to said command of said second means if target player selected by said first means is a hypothetical character in said game program, said numerical value being referred to by said game program, said fourth means changing said numerical value independently from motion of said target player.

2. An entertainment system according to claim 1, wherein said fourth means changes a parameter representing a physical attribute of said hypothetical character when said target player is a hypothetical character controlleed by said game program.

3. An entertainment system according to claim 1, wherein said first means determines said target player to be a selected user before determining whether said selected user is a human user or a hypothetical character.

4. An entertainment system according to claim 1, wherein said first means selects an effect to be applied to said target player as a selected player before determining whether said selected user is a human user or a hypothetical character.

5. An entertainment system according to claim 1, wherein said third means output an instruction for applying a physical effect to said target player.

6. An entertainment system according to claim 1, wherein said third means outputs an instruction for applying an effect visible to said target player through a display connected to said entertainment apparatus.

7. A method of controlling an entertainment system, comprising:
receiving a manual control command at an entertainment apparatus from at least one manual control switch of a manual controller connected to said entertainment apparatus,
wherein said manual controller includes at least one vibration generator for generating vibrations based on a request from said entertainment apparatus;
determining a target player based on said manual control command from said manual controller;
making a command for generating vibrations when said manual control command indicating said vibrations to be applied to said target player is entered,
wherein said vibrations are generated independently from motion of said target player;
determining whether said target player is a human user or a hypothetical character in a game program executed by said entertainment apparatus;
sending said command for generating vibrations to another manual controller if said target player is a human user; and
changing a numerical value of a parameter regarding a hypothetical character corresponding to said command for generating vibrations if said target player is a hypothetical character in said game program, said numerical value being referred to by said game program, and said numerical value being changed independently from motion of said target player.

8. A method according to claim 7, wherein changing said numerical value of a parameter includes changing a parameter representing a physical attribute of said hypothetical character when said target player is a hypothetical character controlled by said game program.

9. A method according to claim 7, wherein said determination whether said target player is a selected user is made before determining whether said selected user is a human user or a hypothetical character.

10. A method according to claim 7, wherein sending said command includes outputting an instruction for applying an effect visible to said target player through a display connected to said entertainment apparatus.

11. A method according to claim 7, wherein sending said command includes outputting an instruction for applying an effect visible to said target player through a display connected to said entertainment apparatus.

12. A storage medium storing a program for use by an entertainment system, wherein said program includes instructions executable by said entertainment system to perform the steps of:
receiving a manual control command at an entertainment apparatus from at least one manual control switch of a manual controller connected to said entertainment apparatus,
wherein the manual controller includes at least one vibration generator for generating vibrations based on a request from said entertainment apparatus;
determining a target player based on said manual control command from said manual controller;
making a command for generating vibrations when said manual control command indicating said vibrations to be applied to said target player is entered,
wherein said vibrations are generated independently from motion of said target player;
determining whether said target player is ahuman user or a hypothetical character in a game program executed by said entertainment apparatus;
sending said command for generating vibrations to another manual controller if said target player is a human user; and
changing a numerical value of a parameter regarding a hypothetical character corresponding to said command for generating vibrations if said target player is a hypothetical character in said game program, said numerical value being referred to by said game program, and said numerical value being changed independently from motion of said target player.

13. A storage medium according to claim 12, wherein changing said numerical value of a parameter includes changing a parameter representing a physical attribute of said hypothetical character when said target player is a hypothetical character controlled by said game program.

14. A storage medium according to claim 12, wherein said determination whether said target player is a selected user is made before determining whether said selected user is a human user or a hypothetical character.

15. A storage medium according to claim 12, wherein sending said command includes outputting an instruction for applying a physical effect to said target player.

16. A storage medium according to claim 13, wherein sending said command includes outputting an instruction for applying an effect visible to said target player through a display connected to said entertainment apparatus.

17. A program, stored in a tangible storage medium, for use by an entertainment system, said program comprising executable instructions that cause said entertainment system to perform the steps of:
receiving a manual control command at an entertainment apparatus from at least one manual control switch of a manual controller connected to said entertainment apparatus,
wherein the manual controller includes at least one vibration generator for generating vibrations based on a request from said entertainment apparatus;
determining a target player based on said manual control command from said manual controller;
making a command for generating vibrations when said manual control command indicating said vibrations to be applied to said target player is entered,
wherein said vibrations are generated independently from motion of said target player;
determining whether said target player is human user or a hypothetical character in a game program executed by said entertainment apparatus;
sending said command for generating vibrations to another manual controller if said target player is a human user; and
changing a numerical value of a parameter regarding a hypothetical character corresponding to said command for generating vibrations if said target player is a hypothetical character in said game program, said numerical value being referred to by said game program, and said numerical value being changed independently from motion of said target player.

18. A storage medium according to claim 17, wherein changing said numerical value of a parameter includes changing a parameter representing a physical attribute of said hypothetical character when said target player is a hypothetical character controlled by said game program.

19. A program according to claim 17, wherein said determination whether said target player is a selected user is made before determining whether said selected user is a human user or a hypothetical character.

20. A program according to claim 17, wherein sending said command includes outputting an instruction for applying a physical effect to said target player.

21. A program according to claim 17, wherein sending said command includes outputting an instruction for applying an effect visible to said target player through a display connected to said entertainment apparatus.

* * * * *